(12) United States Patent
Campbell

(10) Patent No.: US 9,930,162 B2
(45) Date of Patent: Mar. 27, 2018

(54) TECHNIQUES FOR ENHANCING CONTENT ON A MOBILE DEVICE

(71) Applicant: Facebook, Inc., Menlo Park, CA (US)

(72) Inventor: Craig Campbell, Redwood City, CA (US)

(73) Assignee: FACEBOOK, INC., Menlo Park, CA (US)

( * ) Notice: Subject to any disclaimer, the term of this patent is extended or adjusted under 35 U.S.C. 154(b) by 6 days.

(21) Appl. No.: 14/557,814

(22) Filed: Dec. 2, 2014

(65) Prior Publication Data

US 2016/0156774 A1 Jun. 2, 2016

(51) Int. Cl.
*G06F 9/54* (2006.01)
*G06F 3/0488* (2013.01)
*H04M 1/725* (2006.01)
*G06F 3/048* (2013.01)

(52) U.S. Cl.
CPC ........ *H04M 1/72522* (2013.01); *G06F 3/048* (2013.01); *G06F 9/543* (2013.01); *H04M 1/72552* (2013.01); *H04M 2203/2061* (2013.01); *H04M 2250/12* (2013.01); *H04M 2250/58* (2013.01)

(58) Field of Classification Search
CPC .. G06F 9/543; G06F 3/04883; G06F 11/1458; G06F 11/1464; G06F 11/323; G06F 2203/04808; G06F 3/0486
See application file for complete search history.

(56) References Cited

U.S. PATENT DOCUMENTS

| | | | | |
|---|---|---|---|---|
| 6,434,224 B1* | 8/2002 | Nagashima | ........... | H04M 1/575 379/93.17 |
| 6,708,215 B1* | 3/2004 | Hingorani | ........... | G06F 11/3495 370/351 |
| 7,373,603 B1* | 5/2008 | Yalovsky | ................ | G06F 9/543 709/203 |
| 8,400,469 B2* | 3/2013 | Kuwabara | ............. | G06F 3/0481 345/629 |
| 8,793,624 B2* | 7/2014 | Santoro | ............... | G06F 3/04883 345/156 |
| 8,875,059 B2* | 10/2014 | Santoro | ............... | G06F 3/04883 345/173 |
| 2001/0047373 A1* | 11/2001 | Jones | .................... | G06F 3/0481 715/210 |
| 2003/0004802 A1* | 1/2003 | Callegari | .......... | G06F 17/30241 705/14.13 |
| 2009/0276723 A1* | 11/2009 | Narayanan | .............. | G06F 9/543 715/769 |
| 2011/0238626 A1* | 9/2011 | Hao | .................... | G06F 11/1464 707/644 |

(Continued)

*Primary Examiner* — Matthew Sams

(57) ABSTRACT

Techniques for enhancing content on a mobile device are described. A method may include monitoring an input component for the mobile device and detecting a first control directive from the input component, the first control directive to instruct selection of a content portion from a user interface of a first application executing on the mobile device. The method may continue by receiving a second control directive to select the content portion; performing an operation on the selected content portion by a second application different from the first application; and presenting results of the operation on a display of the mobile device. Other embodiments are described and claimed.

18 Claims, 23 Drawing Sheets

(56) References Cited

U.S. PATENT DOCUMENTS

2012/0110486 A1* 5/2012 Sirpal .................... G06F 9/543
715/770
2012/0297348 A1* 11/2012 Santoro ............... G06F 3/04883
715/863
2014/0095562 A1* 4/2014 Rai Bhatti .......... G06F 15/0258
708/206

* cited by examiner

TECHNIQUES FOR ENHANCING CONTENT ON A MOBILE DEVICE

BACKGROUND

There is an ever-increasing amount of data available to computer users, and an increasing number of services that perform various operations on the data. Using these services, however, often interrupts the continuity of the user experience. Further, the use of some of these services may be restricted to data accessible to the service within one application. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later. Various embodiments are generally directed to techniques for enhancing content on a mobile device. Some embodiments are particularly directed to techniques for monitoring a mobile device for specific control directives or context, and displaying enhanced content in response to those specific control directives or contexts, independently of the application that is active when the specific control directives or contexts are detected. In one embodiment, for example, a method may include monitoring an input component for the mobile device and detecting a first control directive from the input component, the first control directive to instruct selection of a content portion from a user interface of a first application executing on the mobile device. The method may continue by receiving a second control directive to select the content portion; performing an operation on the selected content portion by a second application different from the first application; and presenting results of the operation on a display of the mobile device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
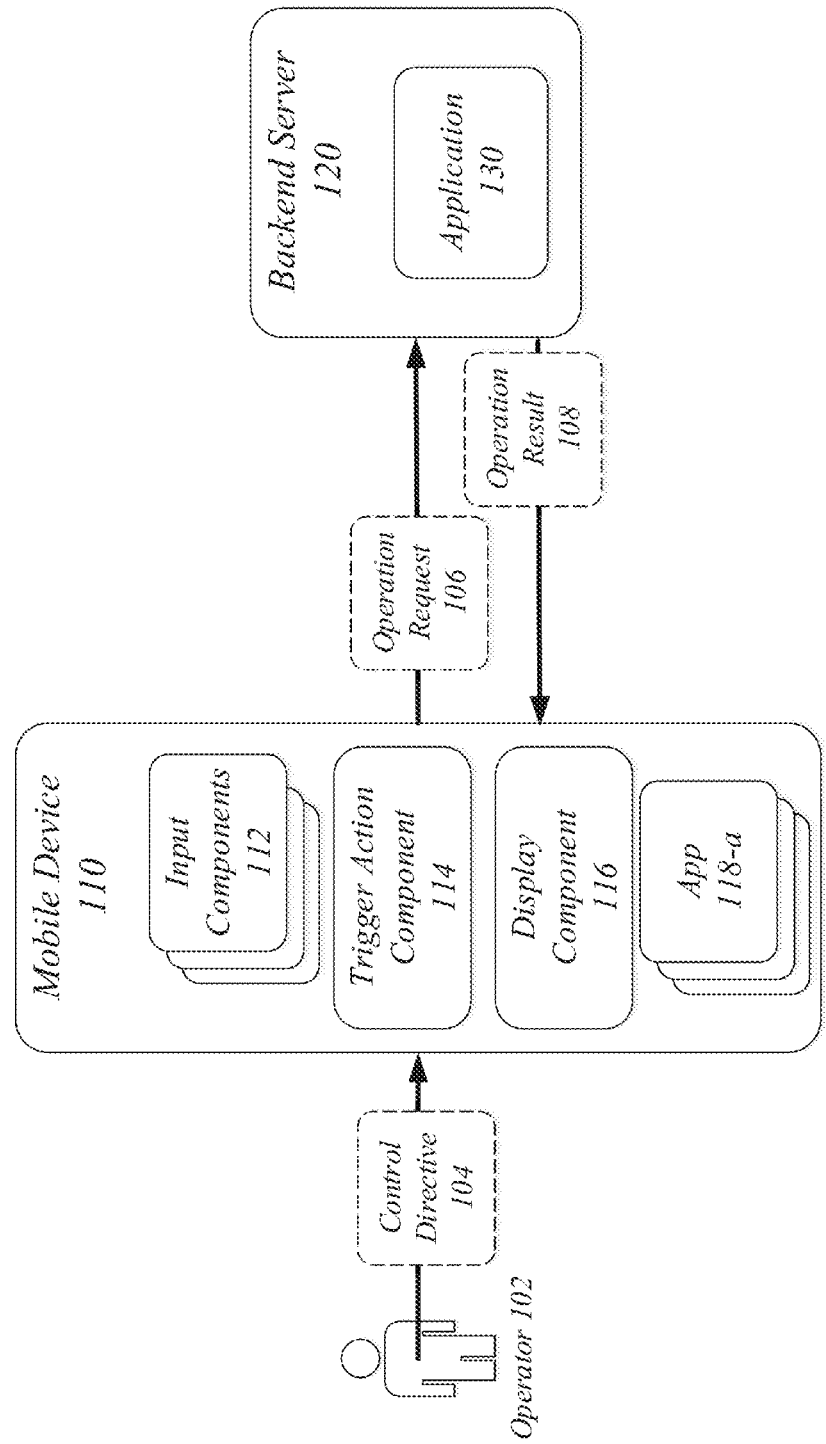
FIG. 1 illustrates an embodiment of an execution system for enhancing content on a mobile device.

Various embodiments are generally directed to techniques for presenting enhanced content to a user of a mobile device. Some embodiments are particularly directed to techniques for monitoring a mobile device for specific control directives or context, and presenting enhanced content in response to those specific control directives or contexts, independently of the application that is active when the specific control directives or contexts are detected.

Users of mobile devices have access to many services and data sources. These services may be available through a specific application, such as a social networking service application or an Internet browser application. A social networking application may, for example, be able to enhance an item of content by showing the user who else in their network is consuming the content. An Internet browser application may be able to translate text displayed in the browser, or to show a map for an address displayed in the browser. These services may be limited, however, to operate only data accessible to the specific application. If another application, for example, a consumer review application, or a text editing application, wanted to provide translation of text, conventionally, that functionality would need to be included in the instructions for the application.

A trigger action component may be an application that can be added by a user to their mobile device. The trigger action component may monitor various input components of the mobile device for one or more specific control directives, which, when detected, may prompt an operation to be performed on content in whatever application is active or in the foreground of the mobile device. For example, when a specific control directive is received, the trigger action component may automatically cause the text from the foreground application to be translated, even if the foreground application does not provide translation functionality. The translation may be displayed to the user without switching to another application, thereby enhancing content without interrupting the user experience.

The trigger action component may also monitor the context of the mobile device and may enhance content or perform various operations when a specific context is detected. Examples of context may include a physical location of the mobile device, a state of the mobile device, the application that is in the foreground, recently used applications, time of day, and so forth.

The operations to enhance content may be performed by various other applications, which may be operative on the mobile device or on a backend server. In some cases the trigger action component may request an operation from another application and then receive the results of the operation for display on the mobile device. Different operations may be performed by different applications, which may be provided by a single service provider, or may be accessible from a variety of service providers. It is worthy to note that the trigger action component may operate independently of any other applications operating on the mobile device, including the operating system, and may therefore provide the one or more content enhancing operations in a predictable way for any of the applications. As a result, the embodiments can improve the user experience with their mobile device and provide useful operations and enhancements to the content therein.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an execution system 100 for presenting enhanced content. In one embodiment, the system 100 may comprise a computer-implemented system 100 having a mobile device 110 and a backend server 120, each comprising one or more components. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of apps 118-$a$ may include five apps 118-1, 118-2, 118-3, 118-4 and 118-5. The embodiments are not limited in this context.

The execution system 100 ("system 100") may include a mobile device 110. The mobile device 110 may be any mobile electronic device capable of receiving control directives, e.g. a control directive 104, from an operator, e.g. operator 102, and capable of communicating with other devices, e.g. a backend server 120, to exchange data and instructions over a network. The mobile device 110 may further be capable to displaying content to the operator 102.

The mobile device 110 may include various hardware components, such as input components 112 and a display component 116. Input components 112 may include any interface components capable of receiving information from the operator 102, such as, but not limited to, a touch-sensitive display, a microphone, and a camera. A display component 116 may include any interface components capable of presenting information to the operator 102, such as, but not limited to, a screen for visual output, a speaker, and a vibration component.

The mobile device 110 may include various software components, such as trigger action component 114 and apps 118. Trigger action component 114 may include instructions that when executed by a processing circuit (not shown) cause the mobile device 110 to perform the operations of the trigger action component 114 as will be described herein. Generally, the trigger action component 114 may be installed by the user and may monitor the input components 112 of the device for specific control directives 104. In response to a specific control directive 104, the trigger action component 114 may send an operation request 106 to a backend server 120 to request an operation on content. The trigger action component 114 may receive the operation result 108 and may display the operation result 108 on display component 116.

An operation request 106 may include content, selected by the operator 102 or by trigger action component 114, which is to be operated on. The operation request 106 may be of any form that invokes the function of a component that will perform the operation, e.g. a function call, a command, and so forth.

An operation result 108 may include an enhanced version of the content selected, or may include other, additional content. Examples of an operation result may include, without limitation, translated text, audio data for speech-from-text, a search result, a modification of existing content, new content, a link to a website, image or video information, social network information, and so forth. The operation result 108 may be of any form suitable for the result, e.g. a document, a link, a text string, an audio file, a video file, an image file, and so forth.

Apps 118 may include any software applications provided on or installed by the user to add functionality to the mobile device 110. Examples may include e-mail apps, games, Internet browsers, calendar apps, contact management apps, retail apps, travel services apps, multi-media presentation apps, social network service apps, and so forth. Generally, on mobile devices, due in part to limited display size, only one app 118 can be a foreground app at a time, although others may be active or dormant in the background. Generally, the operator 102 can only interact with one app 118 at a time due to this constraint.

The system 100 may also include one or more backend servers, such as backend server 120. Backend server 120 may include any computing device capable of communication with mobile devices such as client 110 over a network to exchange data and instructions.

The backend server 120 may include various components, such as one or more applications 130. An application 130 may include a set of software instructions for performing one or more operations. Application 130 may perform operations in response to receiving an operation request 106 from a mobile device 110. Examples of operations may include, without limitation, a translation operation, a text-to-speech operation, a content modification operation, a content creation operation, a content retrieval operation, or a context information operation.

Figure 2:
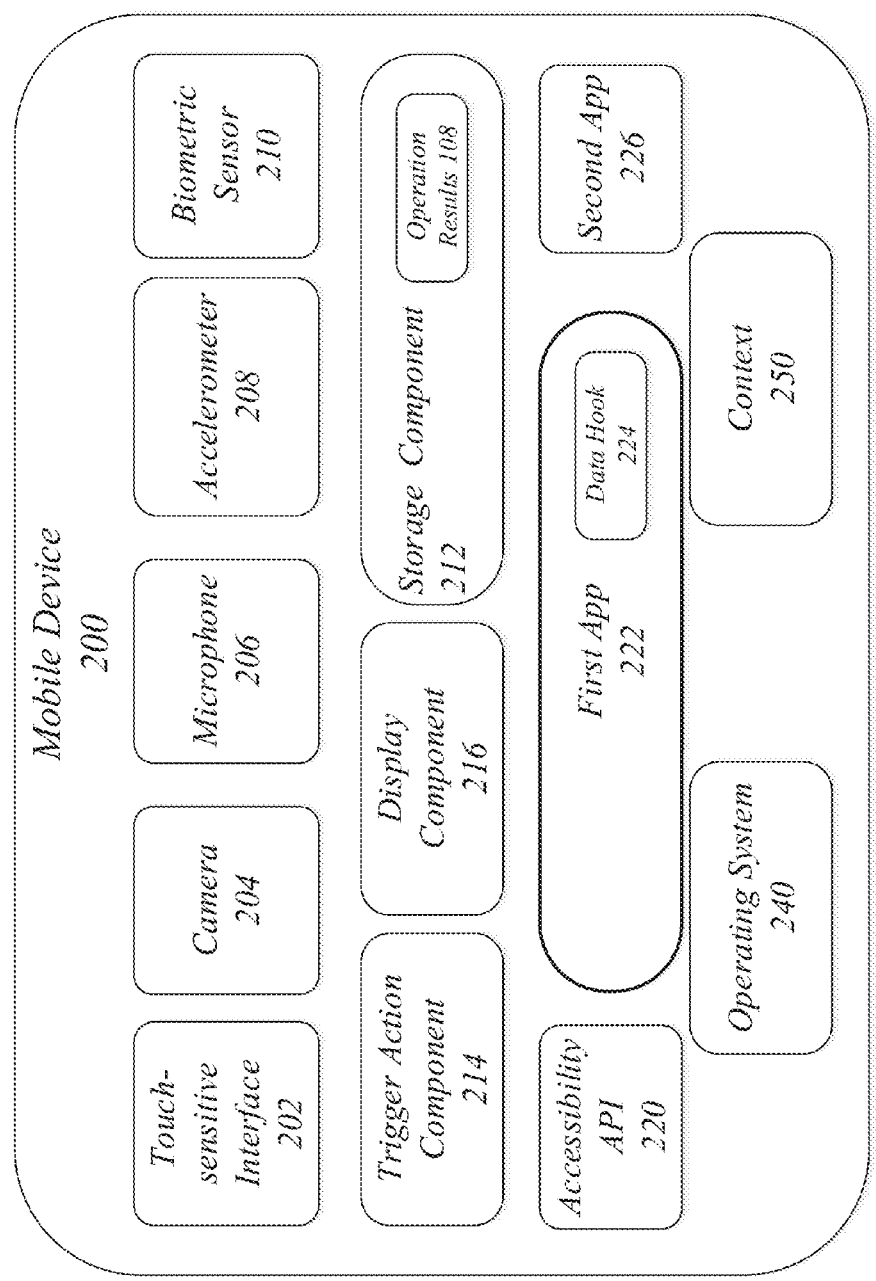
FIG. 2 illustrates an embodiment of a mobile device for the system of FIG. 1.

FIG. 2 illustrates a block diagram of a mobile device 200 for the system 100. The mobile device 200 may be an embodiment of mobile device 110. Mobile device 200 may, in particular, include input components 112 such as, but not limited to, a touch-sensitive interface 202, a camera 204, a microphone 206, an accelerometer 208 and a biometric sensor 210. Other input components may also be included, such as a global positioning system (GPS) component, an altimeter, and so forth. Mobile device 200 may also include a display component 216. In some embodiments, display component 216 and touch-sensitive interface 202 may be integrated into one touch-sensitive display screen.

Mobile device 200 may further include a storage component 212 in the form of one or more computer-readable storage media capable of storing data and instructions for the functions of apps, such as first app 222 and second app 226, as well as an operating system 240. In addition, storage component 212 may store received operation results 108 for future use, as will be described further below. As used herein, "computer-readable storage medium" is not intended to include carrier waves, or propagating electromagnetic or optical signals.

Mobile device 200 may include a trigger action component 214, which may be an embodiment of trigger action component 114. Trigger action component 214 may monitor the input components for specific control directives. For example, trigger action component 214 may monitor touch-sensitive interface 202 for a gesture or a touch in a specific location. Trigger action component 214 may monitor camera 204 for a motion of non-touch gesture. Trigger action component 214 may monitor microphone 206 for a spoken or other audio command. Trigger action component 214 may monitor accelerometer 208 for a sequence and/or speed of motions. Trigger action component 214 may monitor biometric sensor 210 for specific biometric inputs, such as a fingerprint or a retinal scan. The embodiments are not limited to these examples.

When a first specific control directive is detected, the control directive may signal to the trigger action component 214 to expect a second control directive that will select content. The trigger action component 214 may receive a second control directive that selects content from the app 118 that is in the foreground when the first control directive was received, e.g. first app 222. The content selecting second control directive may also be received from an input component 112, either the same input component that received the first control directive, or a different input component. For example, and without limitation, the content selecting second control directive may include a tap gesture, a sequence of tap gestures, a "circling" touch gesture, a scrub touch gesture, a spoken command, a shake of the mobile device, and so forth. Alternatively, trigger action component 214 may select content automatically, without operator input.

The selected content may include, for example and without limitation, text, an image, a video, a document file, and so forth. Text may include a word, multiple words, a sentence, a paragraph, and multiple paragraphs.

The selected content may need to be extracted from the first app 222 so that the selected content may be passed to application 130 or second app 226. Some applications may provide a data hook 224 that allows external applications to access data, e.g. the selected content. A data hook 224 may be part of an application program interface (API) provided by an app.

In some cases, the app 118 may not provide a data hook 224. In these cases, trigger action component 214 may use an accessibility API 220 to extract the selected content. An accessibility API 220 may be provided with an operating system, e.g. operating system 240, to enable accessibility features for the disabled. Accessibility API 220 may, for example, be able to extract text for text-to-speech functions for the visually impaired even when the app 118 does not allow external applications to access its content. The embodiments are not limited to these examples.

Mobile device 200 may include a second app 226. The second app 226 may be an app 118 that is analogous to application 130 on backend server 120. That is, the second app 226 may be software that performs operations on content at the request of trigger action component 214 and provides operation results for display. Second app 226 may also include another app 118 that has been placed in the background by operator 102, or that is installed on mobile device 200 but not currently executing.

Trigger action component 214 may also monitor context 250. Context 250 may include various aspects of mobile device 200 at any given moment. For example, context 250 may include, without limitation, a physical location of the mobile device 200, which app 118 is in the foreground, e.g. first app 222, what the operator 102 is doing on mobile device 200, and a state of the mobile device 200 itself, e.g. in motion or at rest.

Figure 3:
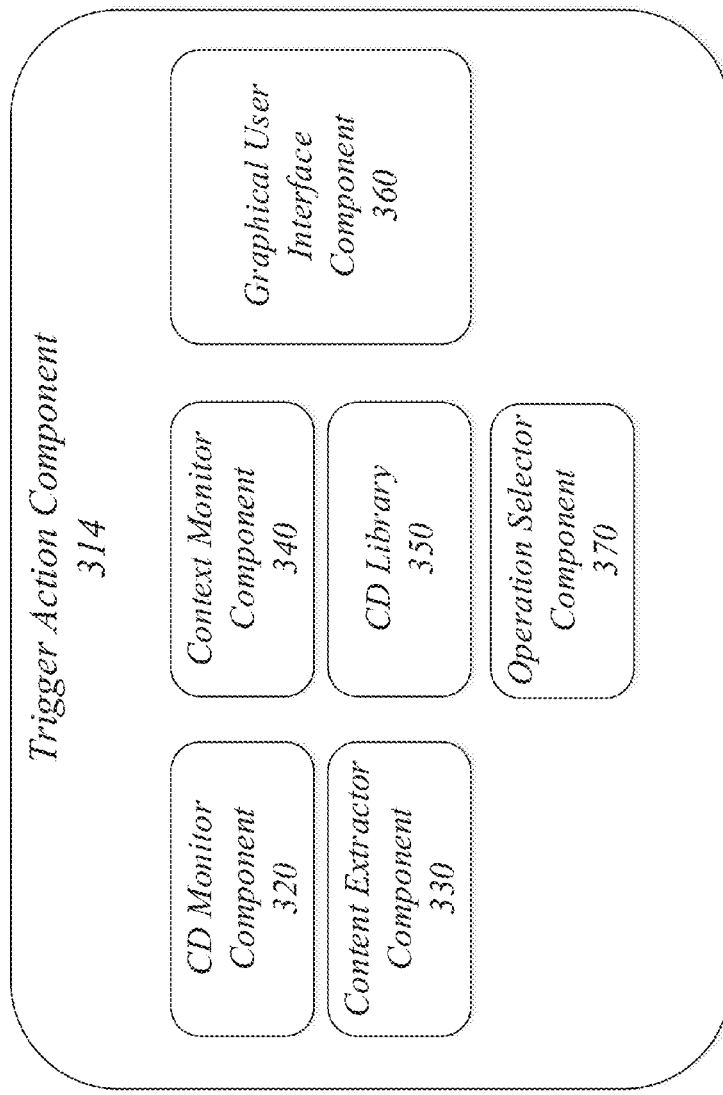
FIG. 3 illustrates an embodiment of a trigger action component for the system of FIG. 1.

FIG. 3 illustrates a block diagram of a trigger action component 314 for the system 100. The trigger action component 314 may be an embodiment of trigger action component 114 and/or trigger action component 214. Trigger action component 314 may include various functional components, such as, but not limited to, a control directive (CD) monitor component 320, a content extractor component 330, a context monitor component 340, a graphical user interface (GUI) component 360, and an operation selector component 370. Trigger action component 314 may also refer to a CD library 350, as will be explained below. More, fewer, or other components may be used to provide the described functionality.

CD monitor component 320 may monitor an input component, e.g. an input component 112, and may detect a control directive from the input component. The detected control directive may instruct selection of a content portion from a user interface of an app executing on the mobile device. That is, the detected control directive may signal to the trigger action component to begin a content enhancing procedure. CD monitor component 320 may also receive a second control directive to select the content portion.

A set of control directives to monitor for may be included in CD library 350. CD Library 350 may include one or more data structures, such as but not limited to, databases, sets, lists, arrays and so forth. CD library 350 may have an entry for each control directive of interest, namely, the control directives that may begin the content enhancing operations described herein. A control directive entry may include the specifics of the control directive, e.g. the input component that will receive it; a type of operator action, e.g. a touch, spoken command, or visual gesture; and a location or directionality of the operator action. The control directive entry may further include a mapping to a particular content enhancing operation to be performed when that particular control directive is detected. The control directive entry may in some cases also indicate a type of content to be selected or extracted. CD library 350 may also include entries for contexts to monitor for and detect, and operations to request when such a context is detected.

Content extractor component 330 may extract content from the selected content. For example, content extractor component 330 may use a data hook, e.g. data hook 224 or an accessibility API, e.g. accessibility API 220, to extract, change, format or otherwise make the selected content available to an application 130 for an operation. In particular, extraction may transform the selected content into a form of input expected by an application 130. Content extractor component 330 may also operate on the extracted content to produce data items for other applications, e.g. application 130, to operate on, as will be discussed with respect to FIG. 4.

Context monitor component 340 may monitor the context of the mobile device for various specific contexts. The contexts of interest may be identified within CD library 350, for example, as a rule, a database entry, a list item, or a component of a searchable data structure. When a specific context is detected, the context monitor component 340 may request an operation associated with the detected context. In some embodiments, the detected context may be stored and associated with any operation result received in response to the operation request triggered by the detected context.

GUI component 360 may present results of the operation on a display of the mobile device. Graphics text or other visual results may be presented on a display component. Audio results may be presented through a speaker. Tactile results may be presented though a vibration component.

For visual results such as text, images and video, GUI component 360 may format the results of an operation. For example, if the result is a URL to a web page, GUI component 360 may load the web page and present it in a window within the foreground app's interface, or floating above the foreground app's interface. Text results may be displayed as-is in a window, or may be placed within a dialog box, or a new content entry, for example. Images or video may be scaled to fit the screen. The embodiments are not limited to these examples.

Operation selector component 370 may be used when more than one operation is possible on specific selected content, and when the first control directive received by the trigger action component 314 does not specify which operation to perform. Operation selector component 370 may, accordingly, examine various inputs and select an operation for the trigger action component 314 to request.

Operation selector component 370 may receive input from one or more sources, such as, but not limited to, a first received control directive (CD), the selected content, the context of the mobile device, and/or data items parsed from the selected content. Operation selector component 370 may use operation selection logic to select one operation from a plurality of possible operations. The operation selection logic may include rules that map types of data items or content to a particular operation. For example, date and/or time data item types may map to a creation or modification operation on a calendar entry. When multiple data types are present, e.g. a proper noun or noun phrase that is not in English, along with a date/time data item, the data items may map to a calendar modification operation instead of a translation operation, because the presence of the date/time data item may be more indicative that a calendar event is present. The embodiments are not limited to these examples.

In some embodiments, the operator may be prompted to select from multiple possible operations. The selection by the operator may cause the operation selection logic to be provided to a machine learning component (not shown), which may update the operation selection logic, e.g. with a new rule, or a heavier weight to an existing rule, according to the selected operation.

It is of note that the trigger application component 314 may be enabled or disabled by the user of the mobile device, e.g. by operator 102. When enabled, the trigger application component 314 executes continually in the background on the mobile device in order to provide the most functionality. In some embodiments, however, the operator may configure the trigger action component 314 to ignore or stop monitoring for control directives and context when certain applications are in the foreground. For example, user preferences for the mobile device, user preferences stored on the back end server, and/or privacy settings on the mobile device may be modified by the user to enable all, some, or none of the functionality of the trigger action component 314 described herein.

Figure 4:
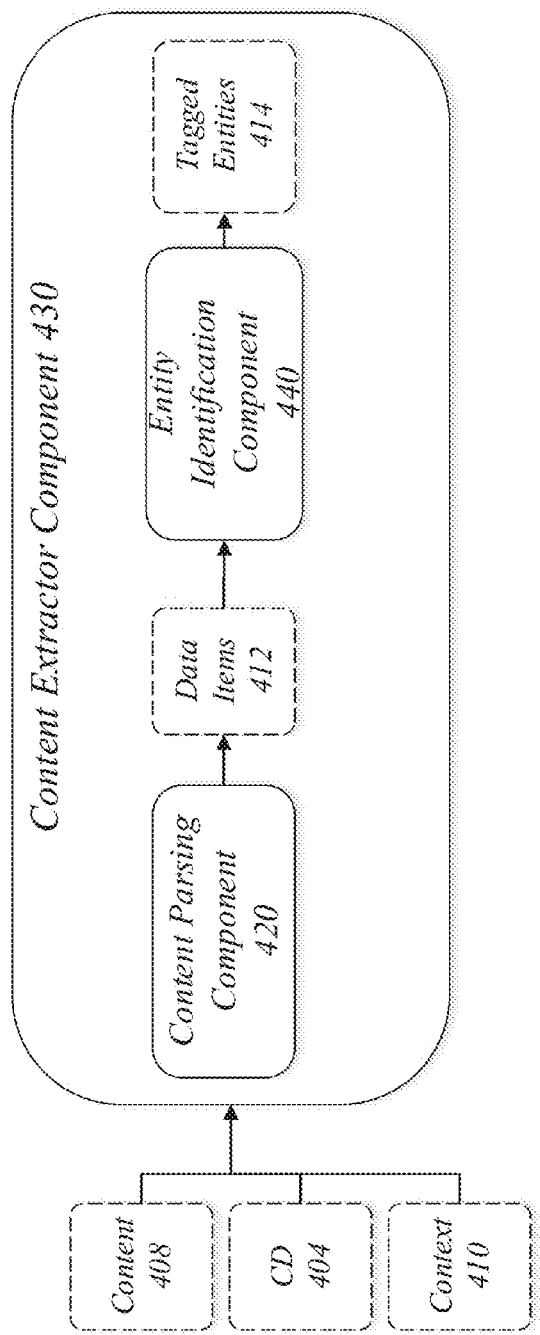
FIG. 4 illustrates an embodiment of an content extractor component for the system of FIG. 1.

FIG. 4 illustrates a block diagram of a content extractor component 430 for the system 100. The content extractor component 430 may be an embodiment of content extractor component 330. The content extractor component 430 may include several functional components, for example and without limitation, a content parsing component 420, and an entity identification component 440.

Content parsing component 420 may receive selected content 408 as input, e.g. from a data hook or an accessibility API, and may separate the content into data items 412. For example, text content may be parsed into words or phrases. Content parsing component 420 may look specifically in text for dates, times, proper nouns, addresses, nouns, and verbs, while ignoring or discarding articles, conjunctions, pronouns and other non-substantive words. When the selected content is image, audio, or video, "parsing" may include fetching or reviewing metadata for the content to identify data items such as a location, a date, a caption or title, and other information about the content.

The data items 412 may be used directly in an operation request, or may be further input into an entity identification component 440. The entity identification component 440 may be operative in particular with a social network service to identify and/or tag individuals or entities in a data item. For example, if a data item includes a proper noun, the entity identification component 440 may retrieve social network data for members or member tagged entities 414 within the social network having that proper noun as a name. Noun phrase data items may exist as topics within a social network, and data for a topic associated with a noun phrase data item may be retrieved.

In some embodiments, the content parsing component 420 may use the control directive (CD) 404, e.g. the first control directive, to determine what data items to look for. For example, if the first control directive is for a translation operation, the content parsing component 420 may look specifically for text that is not in the primary language of the mobile device. If the first control directive is for a content creation operation, the content parsing component 420 may look for data items that could be included in new content. The embodiments are not limited to these examples.

In some embodiments, the content parsing component 420 may use context 410 to determine what data items to look for, either alone, or in conjunction with the CD 404. For example, if the context 410 indicates that the foreground app is an office productivity application, the content parsing component 420 may look for contact information such as e-mail addresses or phone numbers, or for meeting or calendar information such as dates, times, locations, topics and invitees. The embodiments are not limited to these examples.

The data items 412 and tagged entities 414 may be used by a trigger action component to request an operation at an application 130 or a second app 226. The data items 412 and tagged entities 414 may be used as inputs for an operation selector component in determining what operation to request.

Figure 5:
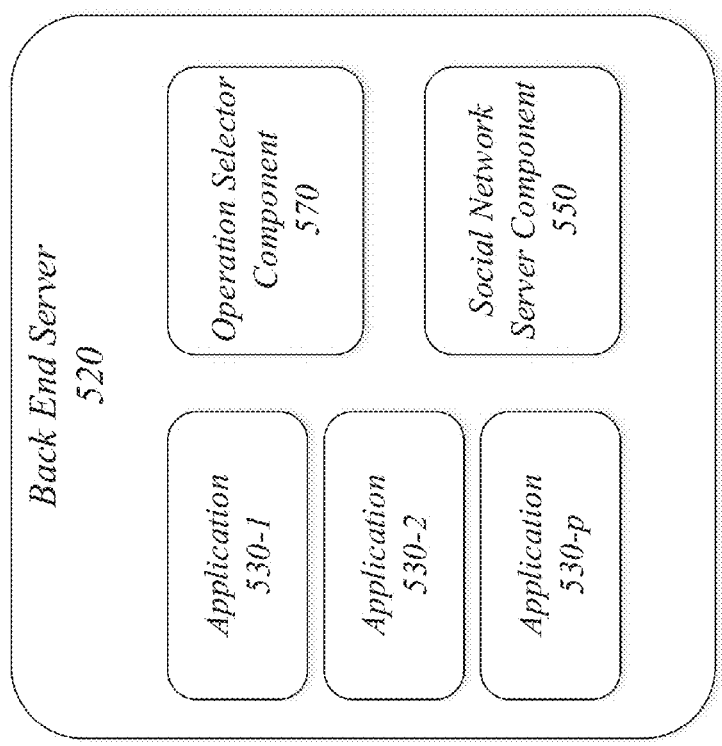
FIG. 5 illustrates an embodiment of a back end server for the system of FIG. 1.

FIG. 5 illustrates a block diagram of an embodiment of a back end server 520 for the system 100. The back end server may be an embodiment of back end server 120. The back end server 520 may include various hardware elements (not shown) and discussed for example, with respect to FIG. 17. The back end server 520 may include various software components, for example, one or more applications, e.g. application 530-1, 530-2, to 530-p (collectively, "applications 530"), and an operation selector component 570. In some embodiments back end server 520 may be a component of a social network service and may include a social network server component 550.

An application 530 may be an embodiment of application 130, and may perform one or more operations in response to a request from a trigger action component. For example, and without limitation, application 530-1 may perform a translation operation, application 530-2 may a content creation operation, and application 530-p may perform a content retrieval operation. In some embodiments, one application 530 may perform more than one type of operation, for example, one application 530 may perform content creation operations and content modification operations.

Some applications 530 may be an application, function, sub-routine, applet, or other software element that is only accessible to or useable by the trigger action component. Some applications 530 may be a server component, or a stand alone application, that operates independently of the trigger action component, e.g. an e-mail application server component, or a search engine application, while providing the ability to request operations from the trigger action component.

The operation selector component 570 may be an embodiment of operation selector component 470 operating on the back end server 520. The operation selector component 570 may receive an operation request from a trigger action component and determine what type of operation to perform and may forward the request to the appropriate application 530 according to the determined operation.

The social network server component 550 may generally provide social network operations, such as, but not limited to, storing and maintaining information about registered member users of the social network, connections between members, content published and consumed by members, statistical information about how content is consumed on the social network, and so forth. An application 530 that performs a content retrieval operation may access the social network server component 550 to retrieve social network data such as the statistical information; what other members in an operator's network have consumed selected content; or a social network "page" or "feed" for a particular member or member entity within the social network associated with selected content. The embodiments are not limited to these examples.

Figure 6:
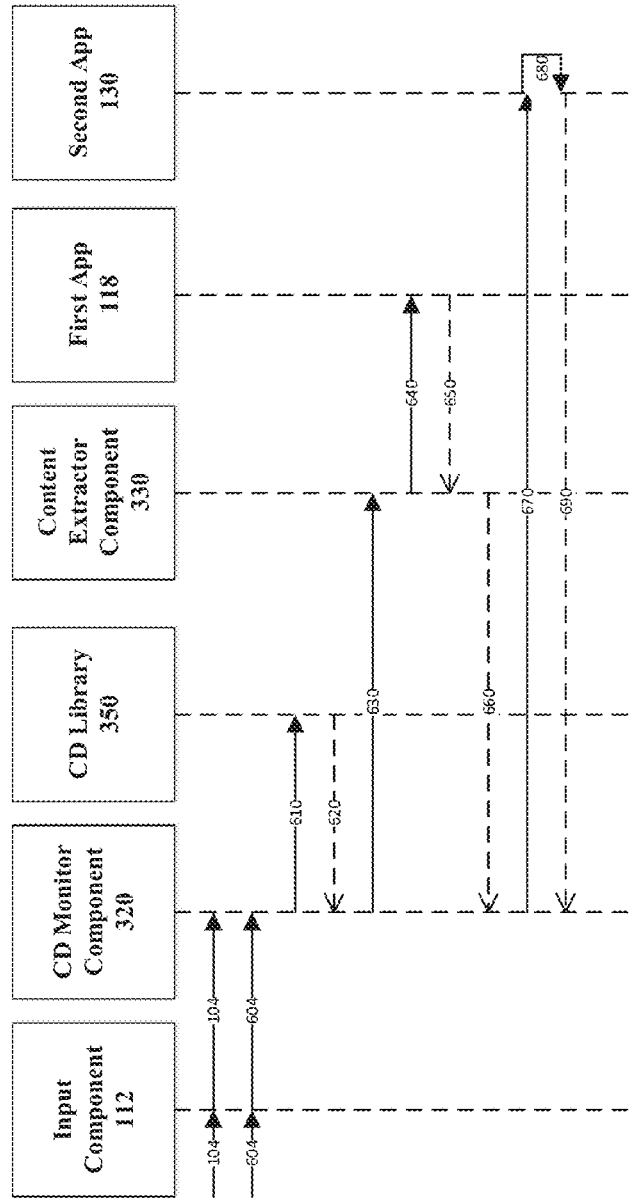
FIG. 6 illustrates an embodiment of a message flow for the system of FIG. 1.

FIG. 6 illustrates an embodiment of a message flow 600 for the system 100. Message flow 600 may represent messages communicated among the components of system 100. In particular, message flow 600 may occur among an input component 112, a CD monitor component 320, a CD library 350, a content extractor component 330, a first app 118 and a second app 130. For the purposes of illustration, first app 118 may be the app 118 operating in the foreground of the mobile device where message flow 600 is taking place. Second app 130 may represent either application 130 on a back end server or second app 226 on the same mobile device as input component 112, CD monitor component 320, CD library 350, content extractor component 330, and first app 118.

In message flow 600, time flows from the top of the diagram toward the bottom. As used herein, a "message" may include data and/or instructions communicated from one component to another, as well as internal functions within a component. Message flow 600 may represent messages communicated while a trigger action component, e.g. trigger action component 314, monitors a mobile device for control directives and enhances content based on the control directives.

Message flow 600 begins when a first control directive 104 is received by input component 112. CD monitor component 320 may detect or receive the control directive 104 from input component 112 or through a mobile device component, such as from the operating system. The first control directive 104 may signal to the trigger action component to select content or to expect a selection of content via a second control directive.

The first control directive 104 may be followed by a second control directive 604 that indicates a portion of content on the mobile device to select. The second control directive 604 may be optional. In some situations, the trigger action component may select the content itself without input from the operator.

In some embodiments, the first control directive 104 may be a selection of content that simultaneously invokes the trigger action component to begin the content enhancing process described herein. For example, a first control directive that is a circling touch gesture may both select the content within the circle and tell the trigger action component to extract content and/or request an operation on the selected content, without requiring two separate control directives. In another example, having contact with a touch-sensitive screen for a defined period may simultaneously select content within an area of the touch and activate the trigger action component to extract content and/or request an operation on the selected content. The embodiments are not limited to these examples.

The message flow 600 may continue when CD monitor component 320 looks up an operation to perform at CD library 350 in message 610. CD library 350 may include, for example, mappings of specific control directives to specific operations, for a variety of control directives. By way of illustration, a single tap gesture at a specific location on a touch-sensitive screen may map to a translation operation, while a left-to-right scrub touch gesture may map to a content retrieval operation. The embodiments are not limited to these examples.

CD monitor component 320 may receive or retrieve the specific operation from CD library 350 in message 620. In some embodiments, message 620 may also include information about what type of content is needed for the operation that mapped to the control directive.

The message flow 600 may continue when CD monitor component 320 instructs content extractor component 330 to extract content with message 630. Message 630 may include information about what type of content to extract, e.g. a particular type of data item.

The message flow 600 may continue when content extractor component 330 extracts content from first app 118 with message 640. Content extractor component 330 may extract selected content directly from first app 118 using a data hook provided with first app 118, or indirectly, using an accessibility API or other API that provides access to app data. The extracted content may be returned to content extractor component 330 in message 650. Content extractor component 330 may provide the extracted content to CD monitor component 320 in message 660.

The message flow 600 may continue when CD monitor component 320 requests an operation on the extracted content from second app 130 in message 670. Message 670 may be in the form of an API call, a request, a command or any other form operable to invoke second app 130. Message 670 may also include the extracted content.

Second app 130 may perform the requested operation in message 680. The requested operation may be any content enhancing operation as described by, but not limited to, the examples discussed herein. The operation results may be returned to CD monitor component 320 in message 690.

Figure 7:
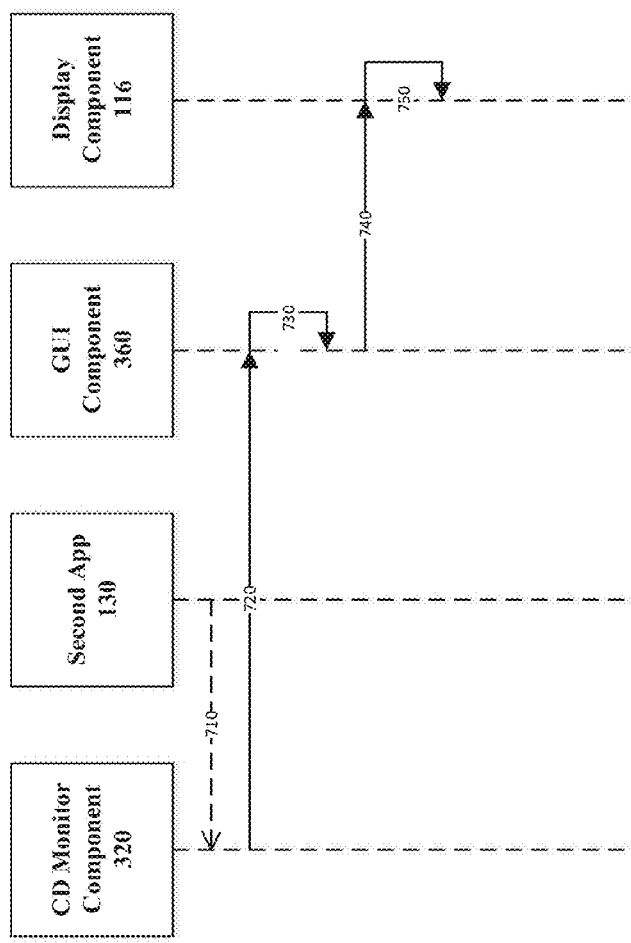
FIG. 7 illustrates an embodiment of a second message flow for the system of FIG. 1.

FIG. 7 illustrates an embodiment of a message flow 700 for the system 100. The message flow 700 may represent messages communicated among the components of system 100. In particular, message flow 700 may occur among a CD monitor component 320, a second app 130, a GUI component 360 and a display component 116. For the purposes of illustration, the second app 130 may represent either application 130 on a back end server or second app 226 on the same mobile device as CD monitor component 320, GUI component 360, and display component 116.

In message flow 700, time flows from the top of the diagram toward the bottom. Message flow 700 may represent messages communicated once a trigger action component, e.g. trigger action component 314, receives results from a content enhancing operation, and may represent a continuation of message flow 600.

The message flow 700 may begin when CD monitor component 320 receives an operation result from second app 130 in message 710. The operation result may be in a variety of forms, for example, but not limited to, a text string, a URL, a document, and so forth.

CD monitor component 320 may pass the operation result to GUI component 360 in message 720. Alternatively, in some embodiments, second app 130 may provide the operation result directly to GUI component 360.

The message flow 700 may continue when GUI component 360 formats the operation result in message 730. Formatting the operation result may include changing the received format into a format that can be displayed on the mobile device within or floating above the foreground application, e.g. first app 222. For example, if the operation result is a text string, GUI component 360 may insert the text string into a GUI element such as a floating window or dialog box. If the operation result is a URL, GUI component 360 may load the web page at the URL. The embodiments are not limited to these examples.

The message flow 700 may continue when GUI component 320 presents the formatted operation result to display component 116 for display in message 740. The display component 116 may then present the operation result to the operator on the mobile device in message 750. Presenting the formatted operation result may include displaying over or within the GUI of the foreground app. As a result, the operator may be presented with enhanced content without having to switch to another application to see the enhanced content, and can return to the foreground app context without losing the context present before the enhanced content was displayed. It is of note that "display" and "present" as used herein may include visual output as well as audio output and tactile output, e.g. vibration.

Figure 8:
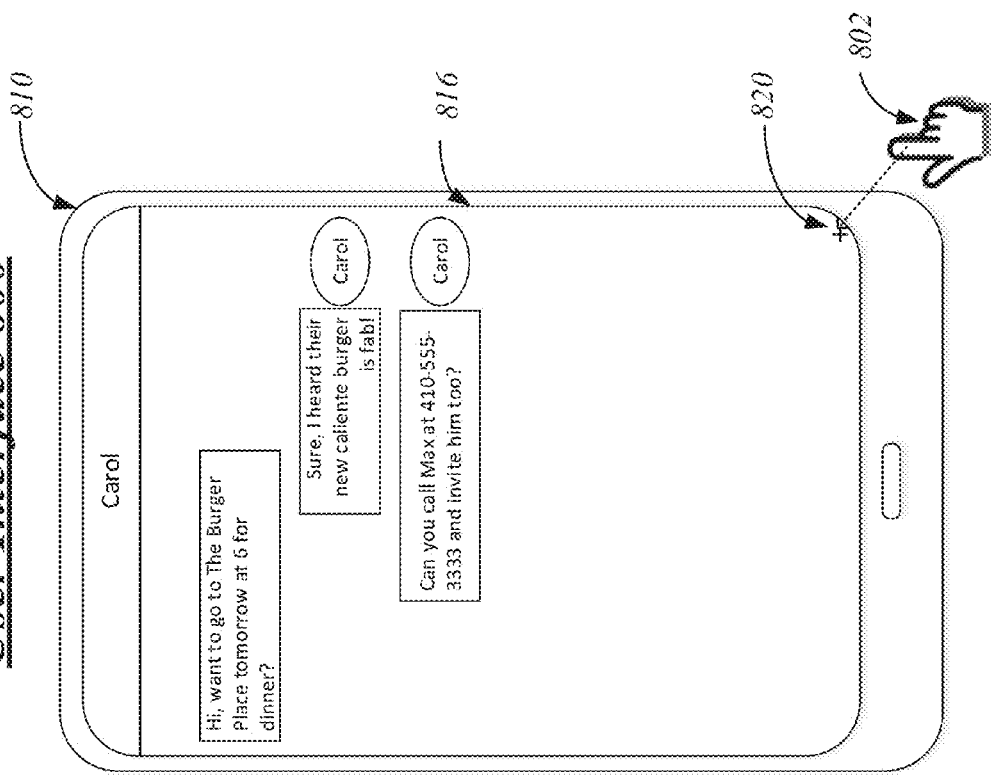
FIG. 8 illustrates an embodiment of a user interface for the system of FIG. 1.

FIG. 8 illustrates an embodiment of a user interface (UI) 800 for the system 100. UI 800 may be presented on a display component 816 of mobile device 810, which may be embodiments of display component 116 and mobile device 110, respectively. In the illustrated example, the UI 800 is for a messaging app. The display component 816 in the illustrated component may be a touch-sensitive screen that includes a specific location 820 at the bottom right of the display component 816. When location 820 is touched or tapped by an operator 802, this gesture may be converted into a control directive. In particular, the control directive may be one that a trigger action component 114 receives as an indication to select content or to receive another control directive selecting content, and to enhance the content with an operation.

UI 800 may receive control directives in other forms in addition to the illustrated example. Instead of a tap or a touch on location 820, for example, the gesture may be a swipe from one location to another on UI 800, a circling gesture, or a sequence of gestures that, in combination, are received as the control directive to select content.

In some embodiments, different gestures or sequences of gestures may indicate different operations to perform. For example, a tap on location 820 may indicate that a translation operation is requested, while a swipe from location 820 to the opposite corner may indicate that a social network search is requested for an entity indicated somewhere in the content on UI 800. The embodiments are not limited to these examples.

Figure 9:
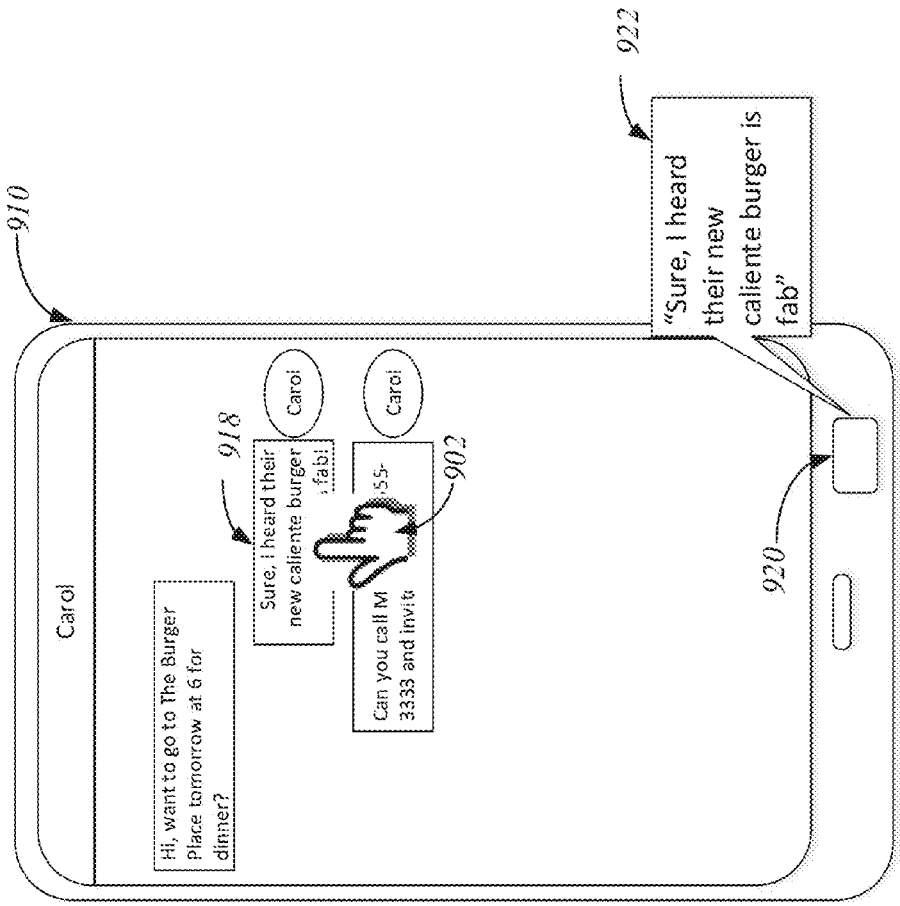
FIG. 9 illustrates an embodiment of a second user interface for the system of FIG. 1.

FIG. 9 illustrates an embodiment of a user interface 900 for the system 100 and an example of a text-to-speech operation. UI 900 may be presented on a display component 916 of mobile device 910, which may be embodiments of display component 116 and mobile device 110, respectively. In the illustrated example, the UI 900 is for a messaging app. In the illustrated example, the mobile device 910 has already received the first control directive indicating to a trigger action component that content is to be selected for a content enhancing operation.

In the illustrated example, the operator 902 has selected the text 918 and the operation to be performed is a text-to-speech operation. The trigger action component has extracted the text 918 and requested a text-to-speech operation from, for example, an application 130 or a second app 226. The trigger action component then presents the operation results in the form of spoken text 922 using a speaker 920 on mobile device 910.

Figure 10:
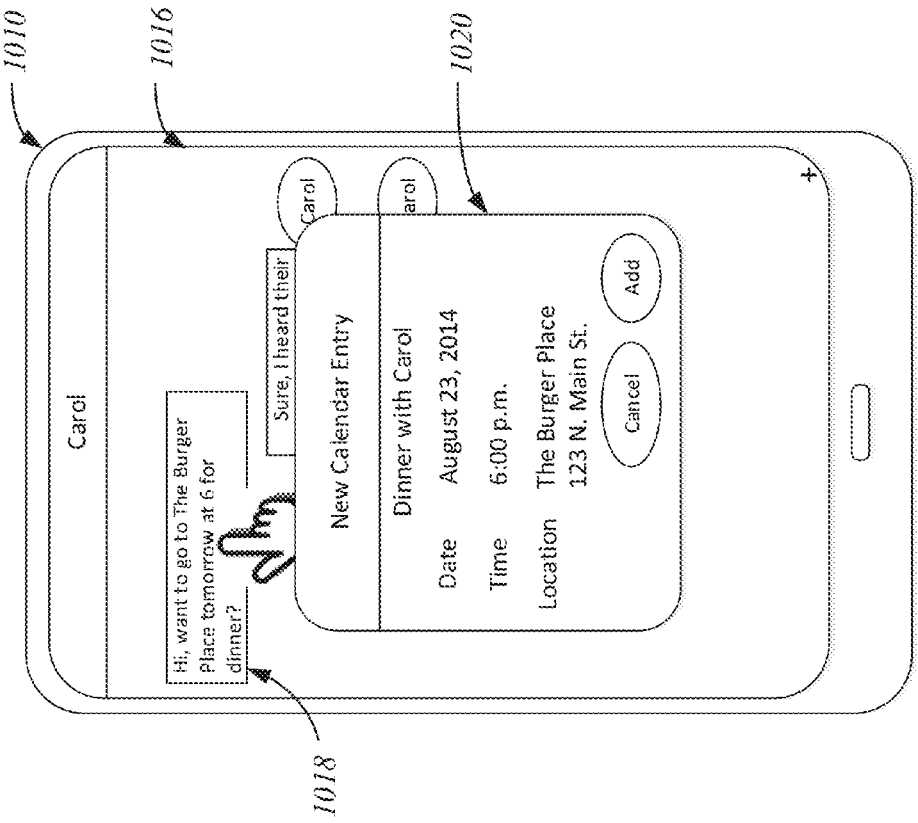
FIG. 10 illustrates an embodiment of a third user interface for the system of FIG. 1.

FIG. 10 illustrates an embodiment of a user interface 1000 for the system 100. UI 1000 may be presented on a display component 1016 of mobile device 1010, which may be embodiments of display component 116 and mobile device 110, respectively. In the illustrated example, the UI 1000 is for a messaging app. In the illustrated example, the mobile device 1010 has already received the first control directive indicating to a trigger action component that content is to be selected for a content enhancing operation, which is a content creation operation.

In the illustrated example, the operator has selected text 1018, which includes a time, a date, and a location. The content creation operation requested by the trigger action component has generated a new item of content, namely, a new calendar entry 1020. The new calendar entry 1020 may be presented within the UI 1000 of the messaging app, for example, as a floating dialog box above the display of the exchanged messages.

In the illustrated example, the trigger action component may have parsed the selected content into various data items, such as a location—"The Burger Place", a date—"tomorrow", and a time—"6" from the selected content, as well as information about the event—"dinner." The trigger action component may pass the data items, and the name of the contact having the message exchange, to an application 130 or a second app 226 with a request to create a new calendar entry. The application 130 or second app 226 may perform various functions such as converting "tomorrow" into a calendar date, inferring that "dinner" means the time should be "6 p.m." and looking up an address for "The Burger Place," before creating the new calendar entry 1020. In an embodiment, the application 130 or the second app 226 may be a calendar app or personal information management app.

In some embodiments, the application 130 or the second app 226 may format the created content into before returning the operation result to the trigger action component. Alternatively, the results to be displayed may provided to the trigger action component, which may create the presentation of the results.

Figure 11:
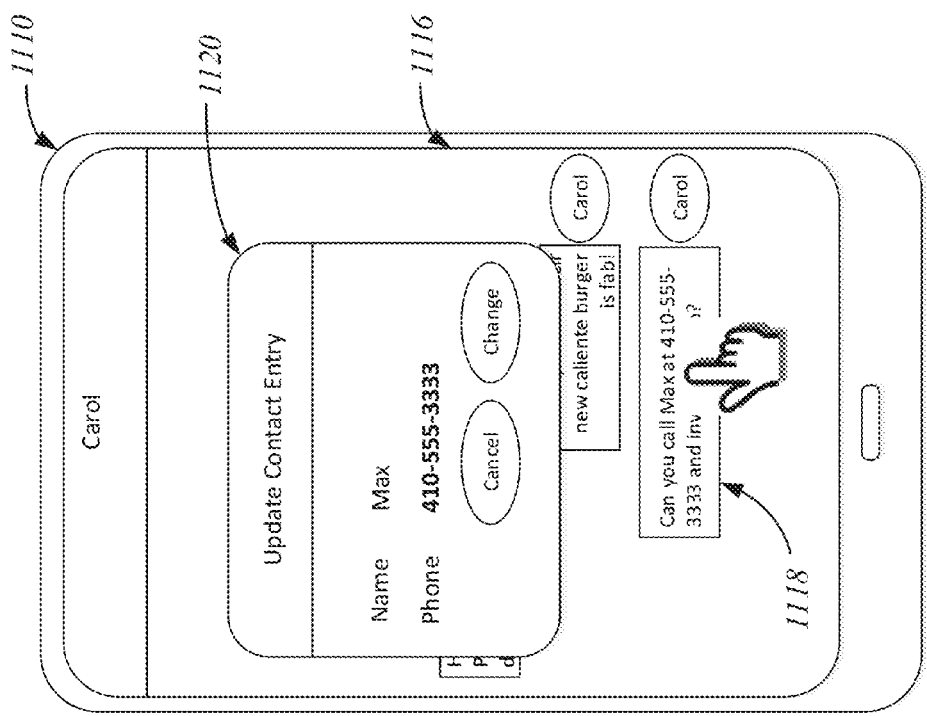
FIG. 11 illustrates an embodiment of a fourth user interface for the system of FIG. 1.

FIG. 11 illustrates an embodiment of a user interface 1100 for the system 100. UI 1100 may be presented on a display component 1116 of mobile device 1110, which may be embodiments of display component 116 and mobile device 110, respectively. In the illustrated example, the UI 1100 is for a messaging app. In the illustrated example, the mobile device 1110 has already received the first control directive indicating to a trigger action component that content is to be selected for a content enhancing operation, which is a content modification operation.

In the illustrated example, the operator has selected text 1118, which includes a name and a telephone number. The content modification operation requested by the trigger action component has identified a contact listing for "Max" and modified the contact listing by adding or changing the phone number. The operation result may be an update contact entry dialog 1118.

In the illustrated example, the trigger action component may have parsed the selected content into various data items, e.g. a name "Max" and a telephone number "410-555-3333." The trigger action component may pass the data items to an application 130 or a second app 226 with a request to modify a contact entry. In some embodiments, the trigger action component may not "know" whether there is an existing contact entry for "Max." In that case, the application 130 or the second app 226 may determine whether there is an existing entry before determining whether to create a new contact entry or to update an existing one.

Figure 12:
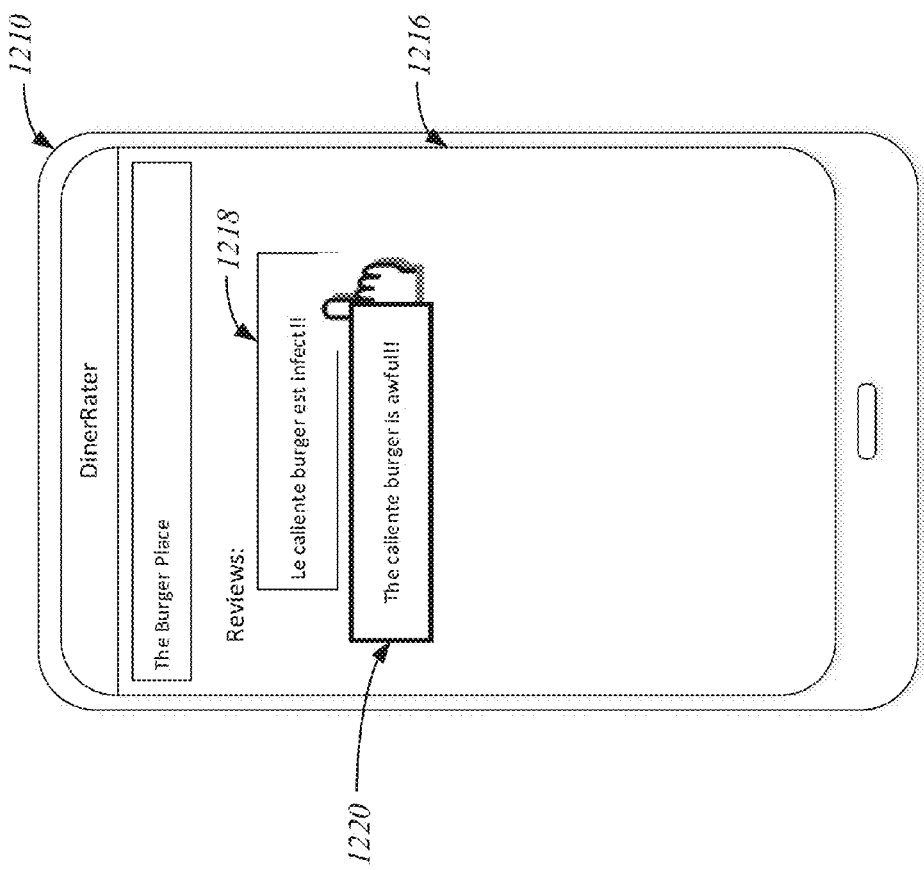
FIG. 12 illustrates an embodiment of a fifth user interface for the system of FIG. 1.

FIG. 12 illustrates an embodiment of a user interface 1200 for the system 100. UI 1200 may be presented on a display component 1216 of mobile device 1210, which may be embodiments of display component 116 and mobile device 110, respectively. In the illustrated example, the UI 1200 is for a restaurant reviews app, and shows the reviews for a specific restaurant. In the illustrated example, the mobile device 1210 has already received the first control directive indicating to a trigger action component that content is to be selected for a content enhancing operation, which is a translation operation.

In the illustrated example, the operator has selected text 1218, which includes text of a user review in French. In some embodiments, the operator may select all of the text or a portion of the text with a second control directive.

The first control directive may be a control directive that is specifically mapped to a translation operation. The trigger action component may extract the text from the review in the app, for example, with a data hook provided by the app, or by using an accessibility API, and may include the text in the request for translation. Alternatively, the trigger action component may recognize that the extracted text is not in the primary or default language used on the mobile device, and may request a translation to the primary language when the first control directive is not specifically mapped to a translation operation.

The operation result may be the translated text, and may be presented in a UI element, such as a floating window 1220. In some embodiments, the selected text 1218 in UI 1200 may be replaced by the translated text.

Figure 13:
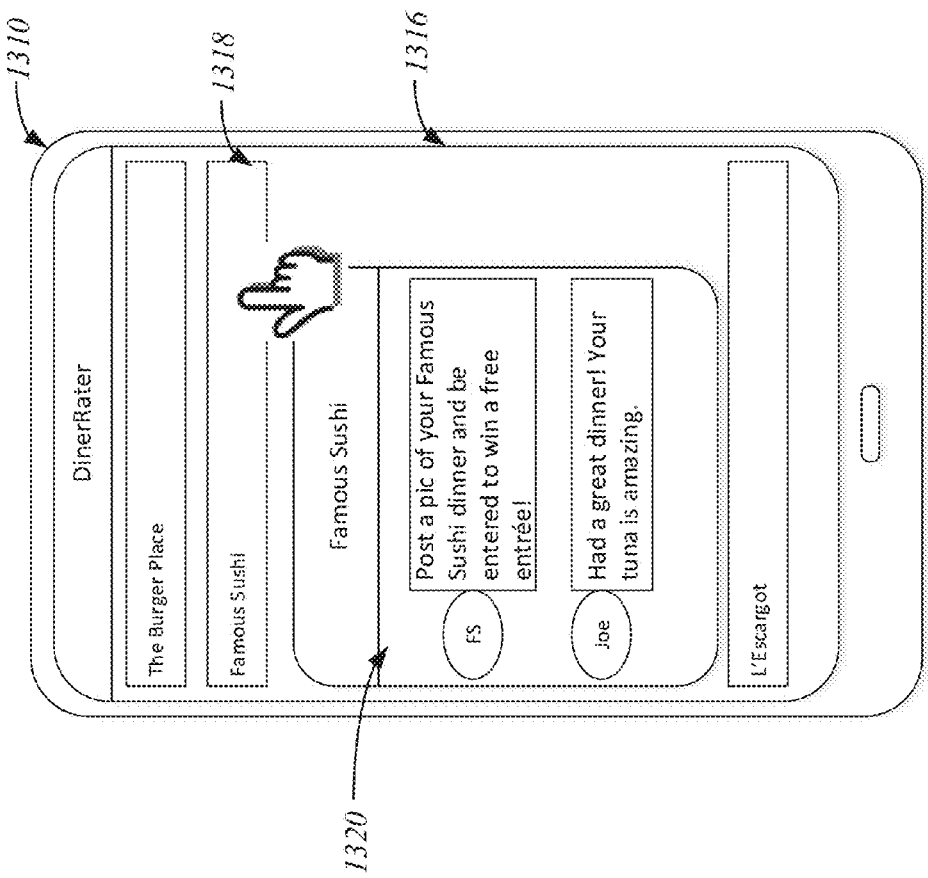
FIG. 13 illustrates an embodiment of a sixth user interface for the system of FIG. 1.

FIG. 13 illustrates an embodiment of a user interface 1300 for the system 100. UI 1300 may be presented on a display component 1316 of mobile device 1310, which may be embodiments of display component 116 and mobile device 110, respectively. In the illustrated example, the UI 1300 is for a restaurant reviews app, and lists several restaurant names. In the illustrated example, the mobile device 1310 has already received the first control directive indicating to a trigger action component that content is to be selected for a content enhancing operation, which is a content retrieval operation.

In the illustrated example, UI 1300 displays a list of restaurant names for which reviews can be read or created. The operator has selected the list item 1318 for "Famous Sushi." The trigger action component may extract the text from the list item 1318 and may pass the text, e.g. "Famous Sushi", to an application 130 or a second app 226 with a request to retrieve content related to the text.

In this example, the operation result that is returned includes a social network "feed" 1320 for the entity of "Famous Sushi" within the social network. For example, the social network feed 1320 may include information both from the entity and from its followers in the social network. The operation result may be displayed within UI 1300, for example, as a window inserted between two of the restaurant list items, or alternatively, as a floating window. The embodiments are not limited to this example.

A content retrieval operation may retrieve a variety of types of content from a variety of sources. For example, and without limitation, a content retrieval operation may return a website associated with a particular business, or a search result from a search engine using the selected content as a search query.

If the content is an image or a video, a content retrieval operation may retrieve image or video data, such as camera information, a location where the image or video was taken, a date or time the image or video was taken or other metadata about the image or video. Additionally, social networking information may be retrieved. For example, what other people connected to the operator on a social network have viewed or commented on an image or video, how popular the image or video is on a social network, how many times the image or video was shared, and so forth.

Figure 14:
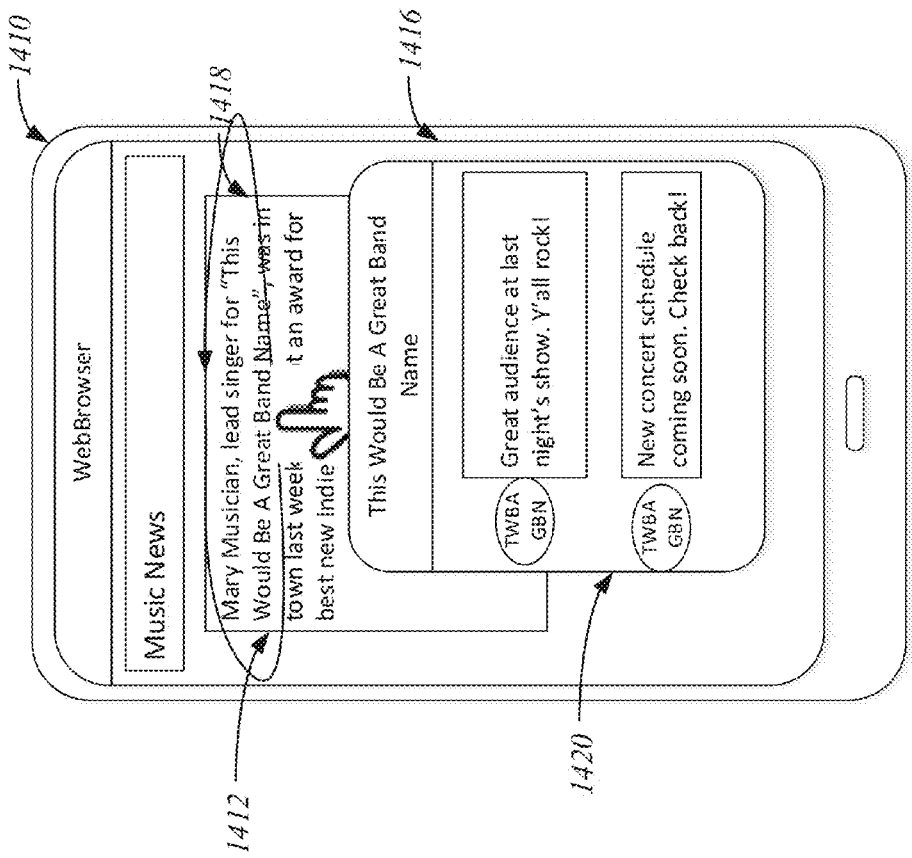
FIG. 14 illustrates an embodiment of a seventh user interface for the system of FIG. 1.

FIG. 14 illustrates an embodiment of a user interface 1400 for the system 100. UI 1400 may be presented on a display component 1416 of mobile device 1410, which may be embodiments of display component 116 and mobile device 110, respectively. In the illustrated example, the UI 1400 is for an Internet browser app. In the illustrated example, the mobile device 1410 has already received the first control directive indicating to a trigger action component that content is to be selected for a content enhancing operation, which is a content retrieval operation.

In the illustrated example, the operator is making a circling touch-gesture on the display component 1416, indicated by line 1412, around a portion of text on a web page displayed in UI 1400. This circling touch-gesture may be converted by the trigger action component into a control directive that selects the text contained within the gesture, that is, "Mary Musician, lead singer for "This Would Be A Great Band Name", was in". The trigger action component may then extract the content, e.g. the selected text from the web page.

The trigger action component may parse the extracted content for data items, and may identify text in quotes, e.g. "This Would Be A Great Band Name," as a data item, along with the name "Mary Musician." As illustrated, the trigger action component may request a content retrieval operation for one or more of the data items, in this case, for "This Would Be A Great Band Name." The operation result that is returned may include a social network "feed" 1420 for the music group entity of "This Would Be A Great Band Name" within the social network. For example, the social network feed 1420 may include information both from the entity and from its followers in the social network. The operation result may be displayed within UI 1400, for example, as a floating window above the web page in UI 1400. The embodiments are not limited to this example.

Other selection mechanisms may be made to select content. For example, other gestures may include a "scrub" touch-gesture that may select content by the operator's finger or a stylus touching one side of an item of content on a touch-sensitive screen and moving over the content item while still in contact with the touch-sensitive screen, and then breaking contact with the screen at the end of the selection; or a tapping gesture that may select one word with a first tap, a line of words with a second tap, and a paragraph with a third tap. Other examples may include a spoken selection, for example, by the operator reading the selection out loud into a microphone. The embodiments are not limited to these examples.

Figure 15:
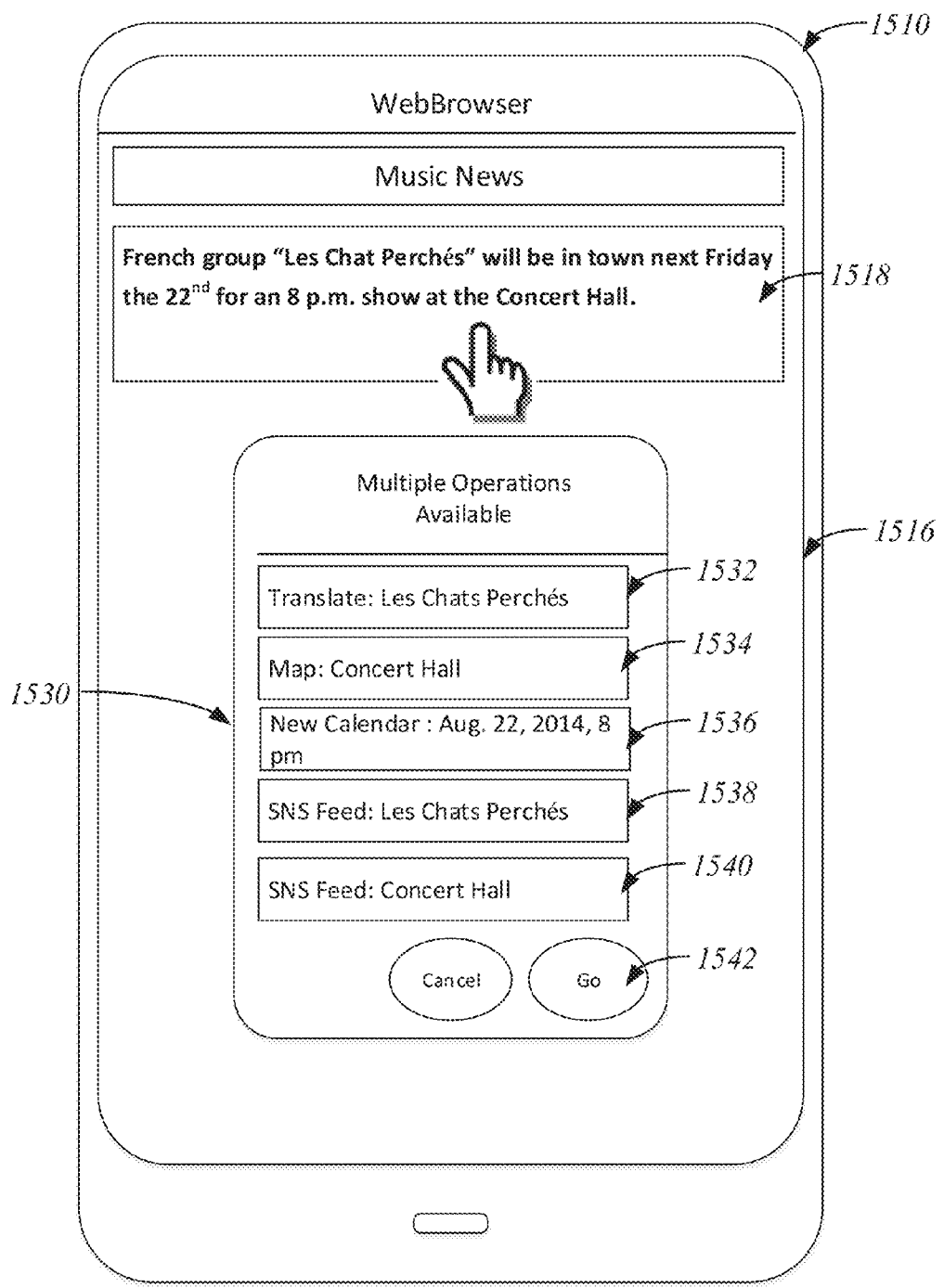
FIG. 15 illustrates an embodiment of a eighth user interface for the system of FIG. 1.

FIG. 15 illustrates an embodiment of a user interface 1500 for the system 100. UI 1500 may be presented on a display component 1516 of mobile device 1510, which may be embodiments of display component 116 and mobile device 110, respectively. In the illustrated example, the UI 1500 is for an Internet browser app. In the illustrated example, the mobile device 1510 has already received the first control directive indicating to a trigger action component that content is to be selected for a content enhancing operation.

In the illustrated example, the operator has selected all of the content 1518. The selected content 1518 includes a number of data items and presents a plurality of possible operations. If the first control directive is not mapped to a specific operation, the trigger action component may prompt the user to select which operation to request, for example, in a dialog 1530.

In the illustrated example, the trigger action component may have parsed the text into the following data items: a first phrase "Les Chats Perchés," a second phrase "Concert Hall," a date, and a time. The first phrase may need a translation operation. It is also an entity name and could have a content retrieval operation performed on it. The second phrase is an entity name that also has a location associated with it. Consequently, the second phrase could have either a content retrieval operation or a map retrieval operation performed on it. The date and time could indicate a content creation operation, e.g. a new calendar entry.

Because the choice of operation in this example is ambiguous, the trigger action component may present a dialog 1530 to the operator to allow the operator to select from a translation operation 1532, a map retrieval operation 1534, a content creation operation 1536, a content retrieval operation 1538, and a content retrieval operation 1540. The operator may select one operation, for example, by a selection control directive on the operation in the dialog 1530, and then with a control directive selecting a go button 1542. The embodiments are not limited to these examples.

Once the operation is selected, the dialog 1530 may be removed and the trigger action component may then request the selected operation from an application 130 or a second app 266. The result of the requested operation may be presented in UI 1500, for example, as shown in the previous illustrations.

In other embodiments, the trigger action component may use an operation selector component, e.g. operation selector component 370, or may request an operation selector component 570, to select an operation when the choice is ambiguous, instead of soliciting operator input.

Figure 16:
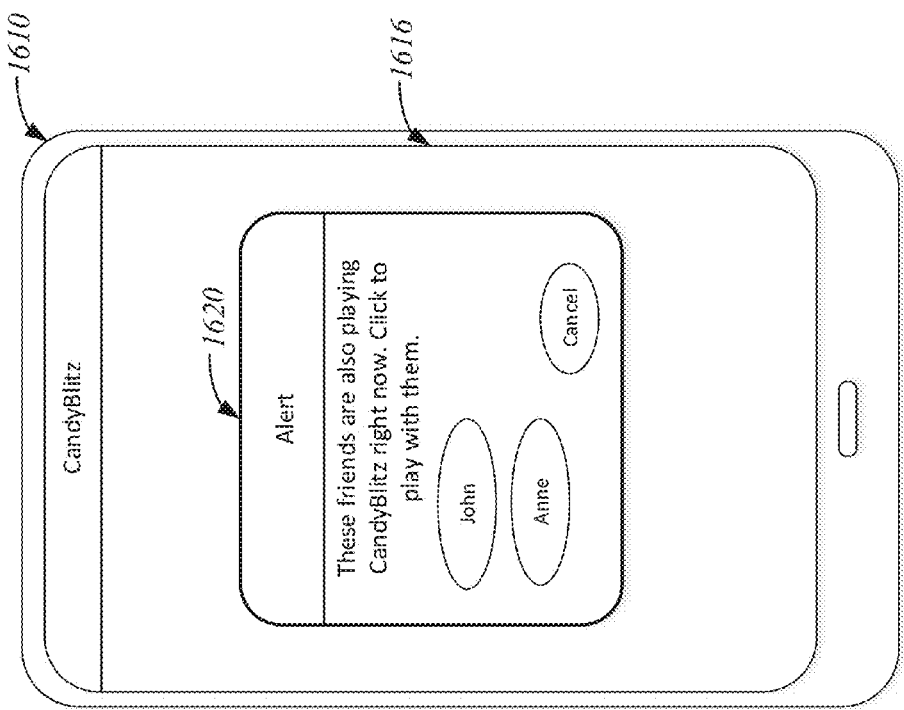
FIG. 16 illustrates an embodiment of a ninth user interface for the system of FIG. 1.

FIG. 16 illustrates an embodiment of a user interface 1600 for the system 100. UI 1600 may be presented on a display component 1616 of mobile device 1610, which may be embodiments of display component 116 and mobile device 110, respectively. In the illustrated example, the UI 1600 is for a game app. In the illustrated example, rather than receiving a control directive from the operator via one of the input components, the trigger action component has detected a context for which an operation can be requested.

In the example, the detected context is the execution of the game app in the foreground. The operation that may be requested is to check if others in a social network for the operator are also using the same game app on other devices. If others are using the same app, the operation result may be a dialog 1620 that alerts the operator of mobile device 1610 to that effect. Where supported, the operation result may also include an offer or suggestion to join the others in using the app together, e.g. in a cooperative or competitive game.

Figure 17:
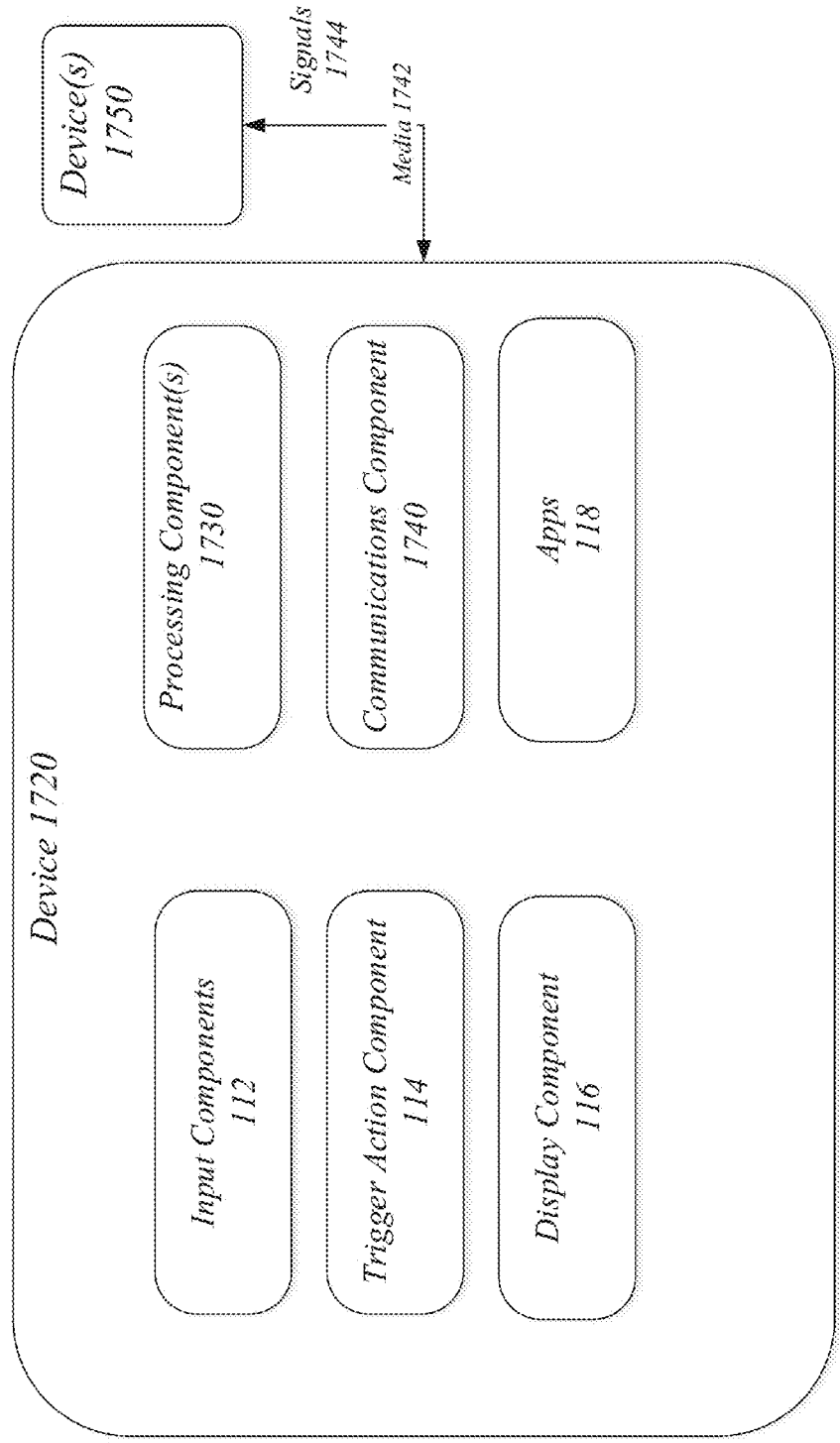
FIG. 17 illustrates a centralized system for the system of FIG. 1.

FIG. 17 illustrates a centralized system 1700. The centralized system 1700 may implement some or all of the structure and/or operations for the system 100 for providing enhanced content in a single computing entity, such as entirely within a single device 1720.

The device 1720 may comprise any electronic device capable of receiving, processing, and sending information, and may be an embodiment of a mobile device, e.g. mobile device 110 or 200. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1720 may execute processing operations or logic for the system 100 using a processing component 1730. The processing component 1730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1720 may execute communications operations or logic for the system 100 using communications component 1740. The communications component 1740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1712 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1720 may communicate with other devices 1750 over a communications media 1712 using communications signals 1714 via the communications component 1740. The devices 1750 may be internal or external to the device 1720 as desired for a given implementation.

The device 1720 may include within it input components 112, a trigger action component 114 and a display component 116. The device 1720 may also include one or more apps 118, which may provide the content enhancing operations described herein. Device 1720 may be operative to carry out the tasks of these elements using processing component 1730 and communications component 1740. Devices 1750 may comprise any of devices 120, 520, or other mobile devices 110, the signals 1714 over media 1712 comprising the interactions between the device 1720 and its elements and these respective devices.

Figure 18:
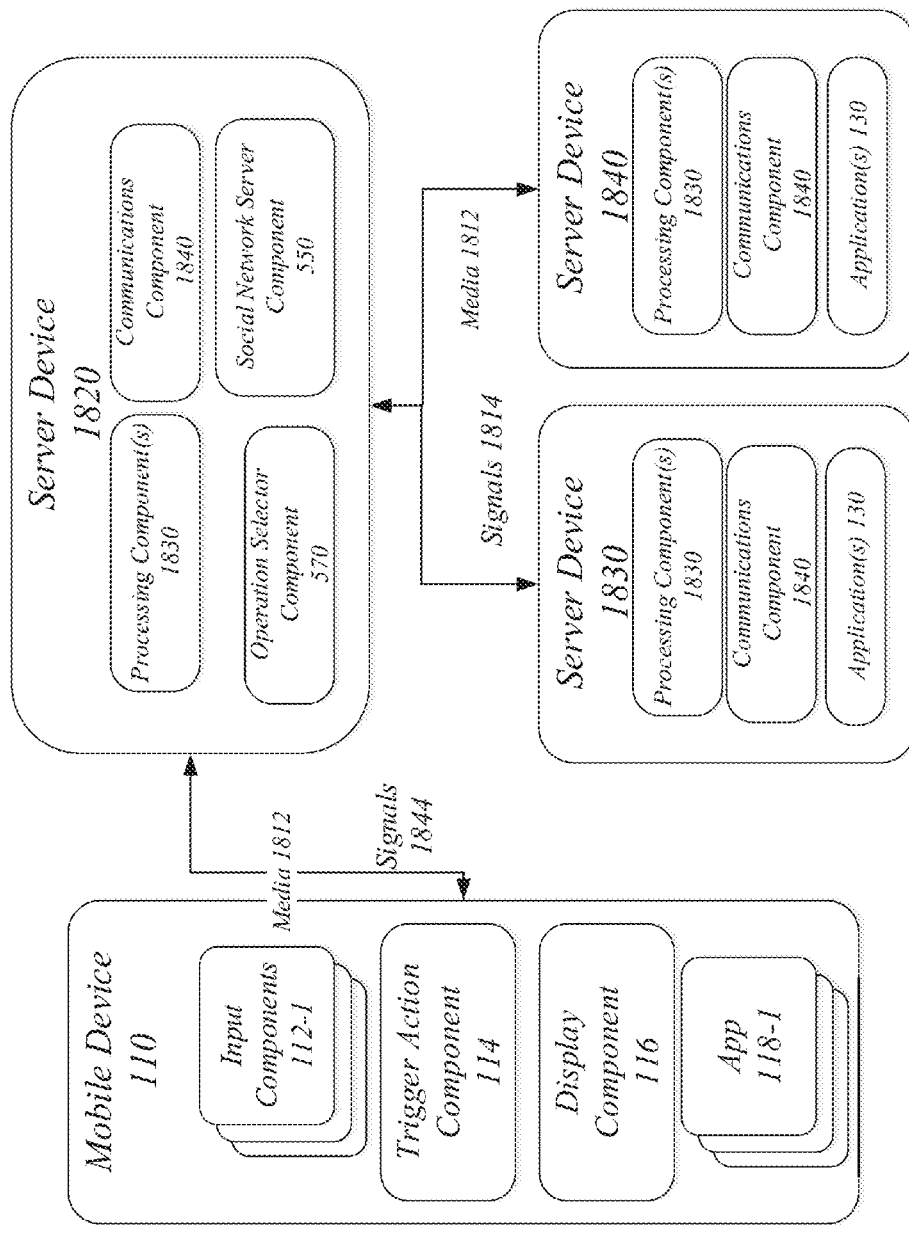
FIG. 18 illustrates an embodiment of a distributed system for the system of FIG. 1.

FIG. 18 illustrates an embodiment of a distributed system 1800. The distributed system 1800 may distribute portions of the structure and/or operations for the system 100 across multiple computing entities. Examples of distributed system 1800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1800 may comprise server devices 1820, 1830, and 1840. In general, the server devices 1820, 1830, and 1840 may be the same or similar to the device 1720 as described with reference to FIG. 17. For instance, the server systems 1820, 1830, and 1840 may each comprise a processing component 1830 and a communications component 1840, which are the same or similar to the processing component 1730 and the communications component 1740, respectively, as described with reference to FIG. 17. In another example, the server devices 1820, 1830, and 1840 may communicate over a communications media 1812 using communications signals 1814 via the communications components 1840.

The server devices 1820, 1830, and 1840 may comprise or employ one or more client programs that operate to perform various methodologies in accordance with the described embodiments. Similarly, the server devices 11820, 1830, and 1840 may comprise or employ one or more server programs that operate to perform various methodologies in accordance with the described embodiments. For example, server device 1820 may implement social networking server component 550 and operation selector component 570. It will be appreciated the server device 1820—or any of the server devices—may itself comprise multiple servers. Server devices 1830 and 1840 may implement one or more applications 130, which may perform various content enhancing operations.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 19:
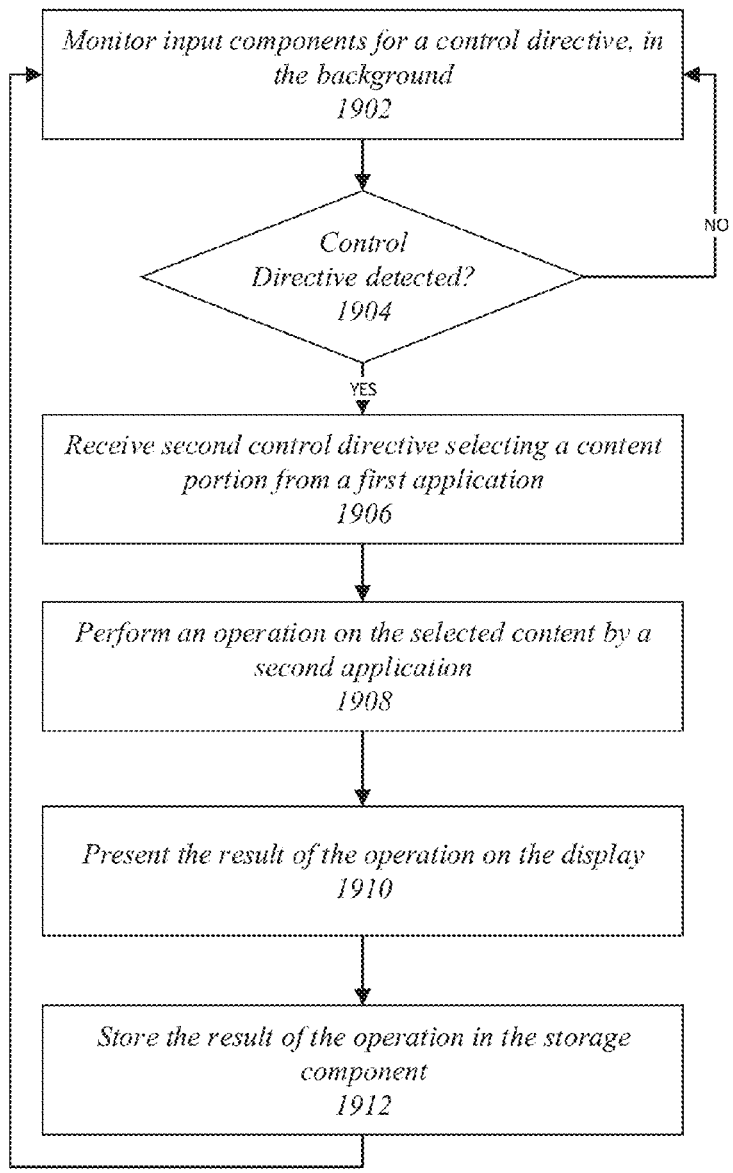
FIG. 19 illustrates an embodiment of a logic flow for the system of FIG. 1.

FIG. 19 illustrates an embodiment of a logic flow 1900 for the system 100. The logic flow 1900 may be representative of some or all of the operations executed by one or more embodiments described herein.

In the illustrated embodiment shown in FIG. 19, the logic flow 1900 may be operative at block 1902 to monitor input components for a control directive. For example, a trigger action component, such as trigger action component 114, may monitor input components 112 in the background on a mobile device 110. The monitoring may take place at the operator's choice, and regardless of what other apps are executing on the mobile device 110.

The logic flow 1900 may be operative at block 1904 to determine whether a control directive has been detected. When a control directive is received, e.g. a control directive 104, the logic flow 1900 may proceed to block 1906, otherwise, when no control directive is received, the logic flow 1900 may return to block 1902. Not all received control directives may be associated with a content enhancing operation. Those control directives may be ignored by the trigger action component.

The logic flow 1900 may be operative at block 1906 to receive a second control directive selecting a content portion from a first application. For example, the operator 102 may indicate through a second control directive which portion of content being presented by the foreground application is to be used in an content enhancing operation.

The logic flow 1900 may be operative at block 1908 to perform an operation on the selected content with a second application. For example, application 130 or a second app 226 may perform a content enhancing operation on the selected content. Content enhancing operations may include, without limitation, a translation operation, a text-to-speech operation, a content modification operation, a content creation operation, a content retrieval operation, or a context information operation.

The logic flow 1900 may be operative at block 1910 to present the result of the operation on a display. For example, the trigger action component 114 may present the results of the operation on display component 116. The presentation of the operation results may be made within or on top of an interface provided by the foreground application.

The logic flow 1900 may be operative at block 1912 to store the result of the operation in a storage component. For example, a trigger action component 214 may store the operation results 108 in a storage component 212 of the mobile device. The results of multiple operations may be stored together, within the limitations of the storage component 212.

In some embodiments, the operation results 108 may be stored with a content and/or a context identifier. A content identifier may represent the particular selected content that produced the operation results 108. A context identifier may represent the context 250 of the mobile device at the time of the operation.

Figure 20:
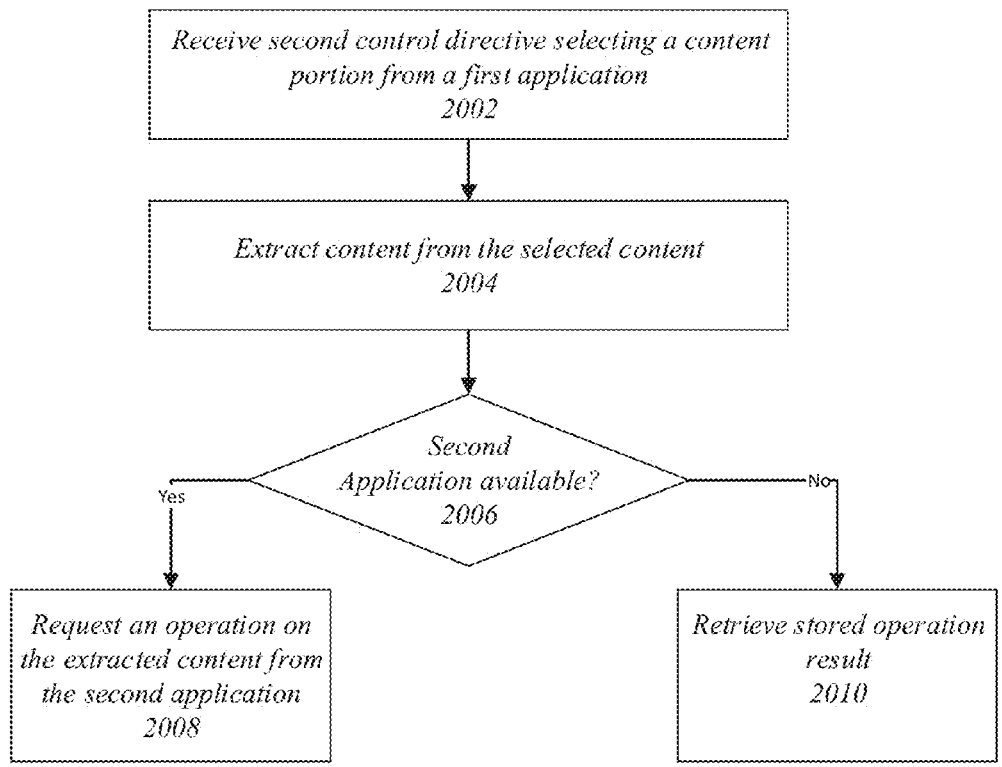
FIG. 20 illustrates an embodiment of a second logic flow for the system of FIG. 1.

FIG. 20 illustrates an embodiment of a logic flow 2000 for the system 100. The logic flow 2000 may be representative of some or all of the operations executed by one or more embodiments described herein. In particular, the logic flow 2000 may be an addition to the logic flow 1900.

In the illustrated embodiment shown in FIG. 20, the logic flow 2000 may be operative at block 2002 to receive a second control directive selecting a content portion from the first application, e.g. the foreground application. Block 2002 may be analogous to block 1906 in the logic flow 1900.

The logic flow 2000 may be operative at block 2004 to extract content from the selected content. For example, if the selected content is not in a form that can be used as an input to a content enhancing operation, the trigger action component 114 may use a data hook or an accessibility API to access the content from the foreground app. Extracting the content may also include parsing the content into data items.

The logic flow 2000 may be operative at block 2006 to determine whether the second app is available to perform a content enhancing operation. In particular, if the second app operated on a different device than the mobile device, e.g. on a back end server 120, the second app may not be available if the communication network is inaccessible, or if the server is malfunctioning.

The logic flow 2000 may be operative at block 2008 to request an operation on the extracted content from the second app when the second app is determined to be available. The request may include the extracted content as a data payload or input to the requested operation.

The logic flow 2000 may be operative at block 2010 to retrieve stored operation results when the second app is determined not to be available. For example, the operation results 108 stored in the storage component 212 may be retrieved instead of receiving operation results from the second app.

It is of note that retrieving stored operation results may only be useful if the currently selected content and requested operation match the selected content and requested operation that generated the stored results, or if the context of the device at the time the stored results were generated matches the context of the current request. The trigger action component may compare (not shown) a stored content identifier and/or context identifier with the current content and/or context to make that determination before retrieving stored operation results. The logic flow 2000 may return to block 1910 following either of blocks 2008 or 2010.

Figure 21:
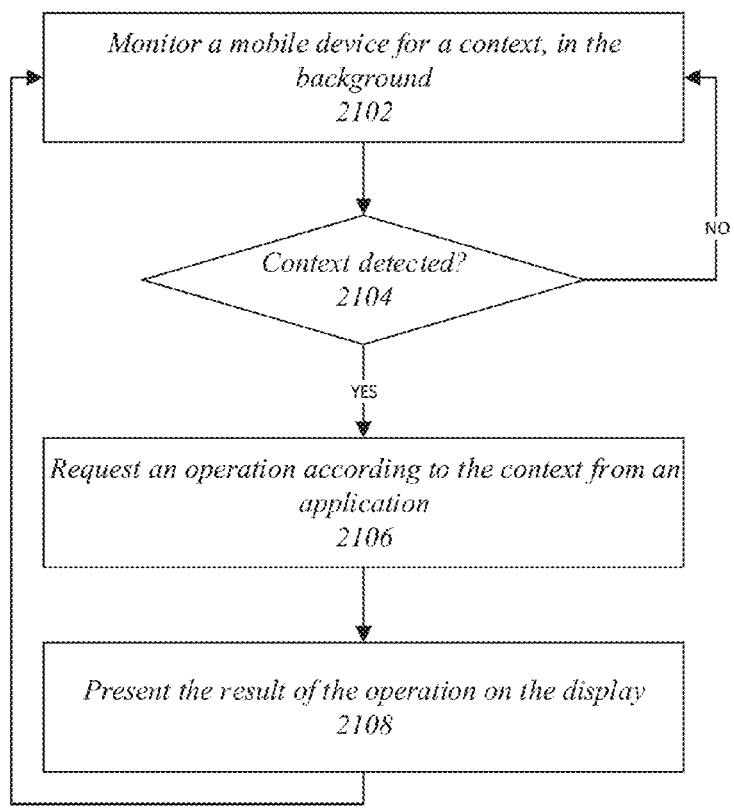
FIG. 21 illustrates an embodiment of a third logic flow for the system of FIG. 1.

FIG. 21 illustrates an embodiment of a logic flow 2100 for the system 100. The logic flow 2100 may be representative of some or all of the operations executed by one or more embodiments described herein.

In the illustrated embodiment shown in FIG. 21, the logic flow 2100 may be operative at block 2102 to monitor a mobile device for a context. For example, a trigger action component 114 may monitor a location of the mobile device, what app is in the foreground, a state of the mobile device, and other information.

The logic flow 2100 may be operative at block 2104 to determine whether a particular context has been detected, e.g. a context that is mapped to or associated with a content enhancing operation.

The logic flow 2100 may be operative at block 2102 to continue monitoring for a specific context as long as no context is detected in block 2104.

The logic flow 2100 may be operative at block 2106 to request an operation according to the context from an application. For example, the trigger action component may request an operation from the app in the foreground, a second app 226, or from an application 130. The operations associated with a detected context may include, for example, identifying another user on a second device using the foreground application on the second device, a content creation operation, a content retrieval operation, or a context information operation.

For example, the detected context may be that the operator 102 has launched and begun playing a game app. A context information operation may identify other users on other devices who are also playing the game. The detected context may be a location that is proximate to a business. A context information operation may retrieve content related to the business for display. In another example, the detected context may be a location, e.g. G.P.S. coordinates, and the context information operation may be to determine what contacts or social network connections are located within a proximity to the detected location. The embodiments are not limited to these examples.

The logic flow 2100 may be operative at block 2108 to present the result of the operation on the display. Block 2108 may be performed similarly to block 1910 from logic flow 1900.

Figure 22:
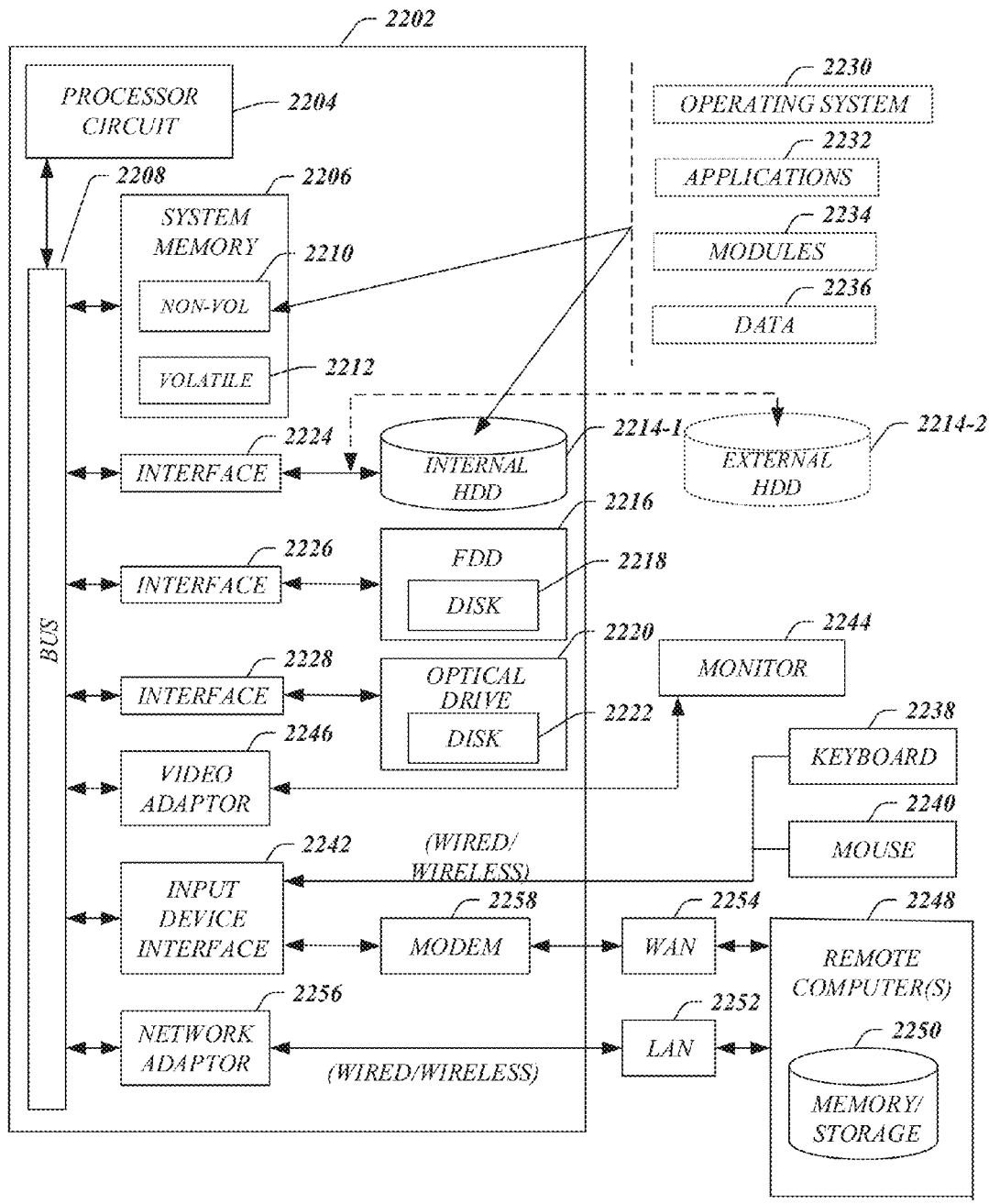
FIG. 22 illustrates an embodiment of a computing architecture.

FIG. 22 illustrates an embodiment of an exemplary computing architecture 2200 suitable for implementing various embodiments as previously described. In one embodiment, the computing architecture 2200 may comprise or be implemented as part of an electronic device. Examples of an electronic device may include those described with reference to FIGS. 17-18, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2200.

As shown in FIG. 22, the computing architecture 2200 comprises a processing unit 2204, a system memory 2206 and a system bus 2208. The processing unit 2204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2204.

The system bus 2208 provides an interface for system components including, but not limited to, the system memory 2206 to the processing unit 2204. The system bus 2208 can be any of several types of bus structure that may further interconnect to a memory bus (with or without a memory controller), a peripheral bus, and a local bus using any of a variety of commercially available bus architectures. Interface adapters may connect to the system bus 2208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 22, the system memory 2206 can include non-volatile memory 2210 and/or volatile memory 2212. A basic input/output system (BIOS) can be stored in the non-volatile memory 2210.

The computer 2202 may include various types of computer-readable storage media in the form of one or more lower speed memory units, including an internal (or external) hard disk drive (HDD) 2214-1 and 2214-2, respectively, a magnetic floppy disk drive (FDD) 2216 to read from or write to a removable magnetic disk 2218, and an optical disk drive 2220 to read from or write to a removable optical disk 2222 (e.g., a CD-ROM or DVD). The HDD 2214, FDD 2216 and optical disk drive 2220 can be connected to the system bus 2208 by a HDD interface 2224, an FDD interface 2226 and an optical drive interface 2228, respectively. The HDD interface 2224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2210, 2212, including an operating system 2230, one or more application programs 2232, other program modules 2234, and program data 2236. In one embodiment, the one or more application programs 2232, other program modules 2234, and program data 2236 can include, for example, the various applications and/or components of the social networking service 110.

A user can enter commands and information into the computer 2202 through one or more wire/wireless input devices, for example, a keyboard 2238 and a pointing device, such as a mouse 2240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2204 through an input device interface 2242 that is coupled to the system bus 2208, but can be connected by other interfaces such as a parallel port, IEEE 1394 serial port, a game port, a USB port, an IR interface, and so forth.

A monitor 2244 or other type of display device is also connected to the system bus 2208 via an interface, such as a video adaptor 2246. The monitor 2244 may be internal or external to the computer 2202. In addition to the monitor 2244, a computer typically includes other peripheral output devices, such as speakers, printers, and so forth.

The computer 2202 may operate in a networked environment using logical connections via wire and/or wireless communications to one or more remote computers, such as a remote computer 2248. The remote computer 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wire/wireless connectivity to a local area network (LAN) 2252 and/or larger networks, for example, a wide area network (WAN) 2254. Such LAN and WAN networking environments are commonplace in offices and companies, and facilitate enterprise-wide computer networks, such as intranets, all of which may connect to a global communications network, for example, the Internet.

When used in a LAN networking environment, the computer 2202 is connected to the LAN 2252 through a wire and/or wireless communication network interface or adaptor 2256. The adaptor 2256 can facilitate wire and/or wireless communications to the LAN 2252, which may also include a wireless access point disposed thereon for communicating with the wireless functionality of the adaptor 2256.

When used in a WAN networking environment, the computer 2202 can include a modem 2258, or is connected to a communications server on the WAN 2254, or has other means for establishing communications over the WAN 2254, such as by way of the Internet. The modem 2258, which can be internal or external and a wire and/or wireless device, connects to the system bus 2208 via the input device interface 2242. In a networked environment, program modules depicted relative to the computer 2202, or portions thereof, can be stored in the remote memory/storage device 2250. It will be appreciated that the network connections shown are exemplary and other means of establishing a communications link between the computers can be used.

The computer 2202 is operable to communicate with wire and wireless devices or entities using the IEEE 802 family of standards, such as wireless devices operatively disposed in wireless communication (e.g., IEEE 802.21 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.21x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 23:
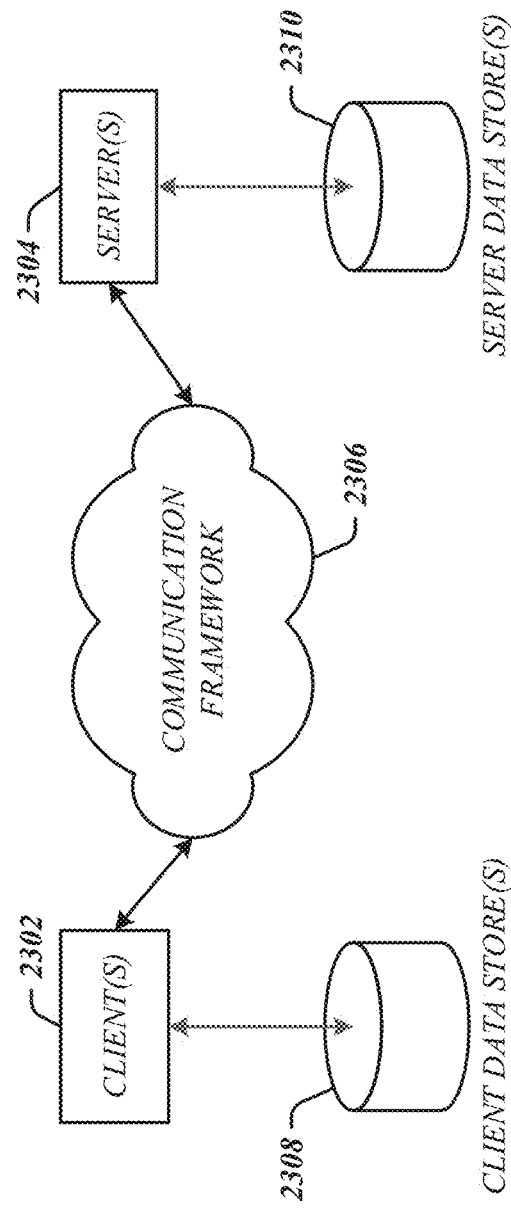
FIG. 23 illustrates an embodiment of a communications architecture.

FIG. 23 illustrates a block diagram of an exemplary architecture 2300 suitable for implementing various embodiments as previously described. The communications architecture 2300 includes various common communications elements, such as a transmitter, receiver, transceiver, radio, network interface, baseband processor, antenna, amplifiers, filters, power supplies, and so forth. The embodiments, however, are not limited to implementation by the communications architecture 2300.

As shown in FIG. 23, the communications architecture 2300 comprises includes one or more clients 2302 and servers 2304. The clients 2302 may implement the devices 1720. The servers 2304 may implement the server devices 1820, 1830, or 1840. The clients 2302 and the servers 2304 are operatively connected to one or more respective client data stores 2308 and server data stores 2310 that can be employed to store information local to the respective clients 2302 and servers 2304, such as cookies and/or associated contextual information.

The clients 2302 and the servers 2304 may communicate information between each other using a communication framework 2306. The communications framework 2306 may implement any well-known communications techniques and protocols. The communications framework 2306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2302 and the servers 2304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Accordingly, embodiments include methods, apparatuses, and computer-readable storage media for content enhancement on mobile devices. For example, an apparatus may include one or more processing circuits; a display to output information from the apparatus to the user; and one or more input components to receive a first control directive from a user. The first control directive may instruct selection of a content portion from a user interface of a first application executing on the one or more processing circuits. The apparatus may also include a storage unit storing instructions that, when executed by the one or more processing circuits, causes a trigger action component to receive a second control directive to select the content portion; request an operation on the selected content portion by a second application different from the first application; and present results of the operation on the display.

On the apparatus, the input components may include one or more of a touch-sensitive display, a camera, a microphone, an accelerometer, or a biometric sensor. Using the touch-sensitive display, the trigger action component may detect a gesture or a sequence of gestures and convert the gesture or sequence of gestures into the first control directive.

The trigger action component may extract the selected content portion from the user interface, for example, by using an accessibility application program interface (API), or a data hook provided with the first application. The selected content may include text, an image, or a video from the first application. The trigger action component may include the selected content in the request for the operation from the second application.

The trigger action component may receive an operation result on the selected content portion from the second application, which may operate on the same apparatus, or on a server device. An operation performed by the second application may include a translation operation, a text-to-speech operation, a content modification operation, a content creation operation, a content retrieval operation, or a context information operation. The trigger action component may present the operation results in a user interface of the second application or in the user interface of the first application.

When the selected content is an image, the result of the operation may include image information. When selected content is a video, the result of the operation may include video information.

The trigger action component may additionally detect a context on the apparatus; perform an operation according to the detected context by a third application; and present results of the operation on the display component. Context may include a location of the apparatus; a state of the first application; or a state of the apparatus. The operation performed by the third application may include identifying another user on a second device using the first application on the second device, a content creation operation, a content retrieval operation, or a context information operation.

The trigger action component may store the operation results with a content identifier and/or a context identifier in the storage component. The trigger action component may retrieve the stored operation results when the second application is not available to perform the operation and/or the selected content or a context of the apparatus is the same as when the operation results were stored.

In various embodiments, there may be a plurality of possible operations to perform on selected content. The trigger action component may select one operation to request, from the plurality of operations, according to the received control directive and the selected content. The operation may be selected at the apparatus by the trigger operation component. The trigger action component may parse the selected content into one or more data items, and select an operation according to a type of the one or more data items.

The trigger operation component may select an operation by prompting a user to select one of the plurality of operations and receive a selection of one operation via a control directive. In some embodiments, the selection by the user may be stored; and used in a machine learning operation to generate operation selection logic. In some embodiments, the one operation may be selected at a server device.

A computer-implemented method may execute on a mobile device and may include monitoring an input component for the mobile device and detecting a first control directive from the input component, the first control directive to instruct selection of a content portion from a user interface of a first application executing on the mobile device. The method may continue by receiving a second control directive to select the content portion; performing an operation on the selected content portion by a second application different from the first application; and presenting results of the operation on a display of the mobile device. The selected content may include, for example, text, an image, or a video from the first application.

The input component may include any of a touch-sensitive display, a camera, a microphone, an accelerometer, or a biometric sensor. The method may include detecting a gesture or a sequence of gestures from a touch-sensitive display; and converting the gesture or sequence of gestures into the first control directive.

The method may include extracting the selected content portion from the user interface, for example, by using an accessibility application program interface (API) or a data hook provided with the first application.

The method may include requesting an operation on the selected content portion from the second application. The request for the operation may include the selected content.

An operation performed on the selected content portion by the second application may include a translation operation, a text-to-speech operation, a content modification operation, a content creation operation, a content retrieval operation, or a context information operation. When the selected content is an image, the result of the operation may include image information. When selected content is a video, the result of the operation may include video information.

The method may include receiving an operation result on the selected content portion from the second application, which may be executing on the mobile device or on a server device. The operation results may be presented by the method in a user interface of the second application or in the user interface of the first application executing on the mobile device.

The method may include detecting a context on the mobile device; performing an operation according to the detected context by a third application; and presenting results of the operation on the display of the mobile device. The detected context may include, for example, a location of the mobile device; a state of the first application; or a state of the mobile device.

The method may include performing an operation by the third application different from the first application, where the operation may include, for example, identifying another user on a second device using the first application on the second device, a content creation operation, a content retrieval operation, or a context information operation.

The method may include storing the operation results with a content and/or a context identifier. The stored operation results may be retrieved by the method, for example, when the second application is not available to perform the operation, or when at least one of the selected content or a context of the mobile device is the same as when the operation results were stored.

When a plurality of operations are possible for a given selection of content, the method may include selecting one operation to request, from the plurality of operations, according to the received control directive and the selected content. The selection of the one operation may be done at the mobile device, either automatically by the method, or by prompting a user to select one of the plurality of operations and receiving a selection of one operation via a control directive. When the one operation is user-selected, the method may include storing the selection by the user; and using the stored selection in a machine learning operation to generate operation selection logic. Alternatively, the one operation may be selected at a server device.

When selecting the one operation is performed by the mobile device, the method may include parsing the selected content into one or more data items; and selecting an operation according to a type of the one or more data items.

A computer-readable storage medium may include instructions that, when executed, cause a mobile device to: detect a context on the mobile device; perform an operation according to the detected context by a first application; and present results of the operation on a display component of the mobile device. The detected context may include, for example, a location of the mobile device; a state of a second application executing on the mobile device; or a state of the mobile device.

The instructions that cause an operation to be performed by the first application may include instructions for, e.g. identifying another user on a second device using the second application on the second device, a content creation operation, a content retrieval operation, or a context information operation. The first application may execute on the mobile device, or on a server device.

The computer-readable storage medium may include instructions that cause the mobile device to monitor an input component for the mobile device; receive a first control directive from a user, the first control directive to instruct selection of a content portion from a user interface of a second application executing on the mobile device; receive a second control directive to select the content portion; perform an operation on the selected content portion by the first application different from the second application; and present results of the operation on the display.

The input components may include, for example, a touch-sensitive display, a camera, a microphone, an accelerometer, or a biometric sensor.

The computer-readable storage medium may include instructions that cause the mobile device to detect a gesture or a sequence of gestures from an input component comprising a touch-sensitive display; and convert the gesture or sequence of gestures into the first control directive.

The computer-readable storage medium may include instructions that cause the mobile device to extract the selected content portion from the user interface, for example, by using an accessibility application program interface (API) or a data hook provided with the second application.

The computer-readable storage medium may include instructions that cause the mobile device to request an operation on the selected content portion from the first application and include the selected content in the request for the operation from the first application, and to receive an operation result on the selected content portion from the first application.

The instructions for an operation on the selected content portion performed by the first application may include instructions for a translation operation, a text-to-speech operation, a content modification operation, a content creation operation, a content retrieval operation, or a context information operation.

The computer-readable storage medium may include instructions that cause the mobile device to present the operation results in a user interface of the first application or in the user interface of the second application.

The computer-readable storage medium may include instructions that cause the mobile device to select text, an image, or a video from the second application as the content portion.

The computer-readable storage medium may include instructions that cause the mobile device to store the operation results with a content or a context identifier. The computer-readable storage medium may include instructions that cause the mobile device to retrieve the stored operation results when the first application is not available to perform the operation or to retrieve the stored operation results when at least one of the selected content or a context of the mobile device is the same as when the operation results were stored.

The computer-readable storage medium may include instructions that cause the mobile device to: select one operation to request, from a plurality of operations, according to the received control directive and the selected content. The instructions may cause the mobile device to prompt a user to select one of the plurality of operations and receive a selection of one operation via a control directive, and to store the selection by the user; and use the stored selection in a machine learning operation to generate operation selection logic.

When the instructions cause the mobile device to select the one operation, the computer-readable storage medium may include instructions that cause the mobile device to parse the selected content into one or more data items; and select an operation according to a type of the one or more data items.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
monitoring an input component for a mobile device by a trigger action component executing on the mobile device while a first application different from the trigger action component presents a user interface on a display of the mobile device;
detecting, by the trigger action component, a first control directive from the input component, the first control directive to instruct selection of a content portion from the user interface of the first application and received while the user interface of the first application is presented;
receiving a second control directive to select the content portion from the user interface of the first application;
selecting, by the trigger action component, one operation according to a mapping of a plurality of control directives to a plurality of operations;
performing the selected operation on the selected content portion by a second application different from the first application and different from the trigger action component, the operation performed by the second application while the first application remains in a foreground state on the mobile device;
receiving, at the trigger action component, an operation result comprising second content different from the selected content from the second application; and
presenting the operation results on a display of the mobile device while the first application remains in the foreground state.

2. The computer-implemented method of claim 1, comprising extracting the selected content portion from the user interface of the first application.

3. The computer-implemented method of claim 1, comprising requesting an operation on the selected content portion from the second application and receiving an operation result on the selected content portion from the second application.

4. The computer-implemented method of claim 1, comprising:
detecting a context on the mobile device;
performing an operation according to the detected context by a third application; and
presenting results of the operation on the display of the mobile device.

5. The computer-implemented method of claim 1, comprising storing the operation results with a content identifier and retrieving the stored operation results when the second application is not available to perform the operation.

6. The computer-implemented method of claim 1, comprising storing the operation results with a context identifier and retrieving the stored operation results when at least one of the selected content or a context of the mobile device is the same as when the operation results were stored.

7. The computer-implemented method of claim 1, comprising:
parsing the selected content into one or more data items; and
selecting an operation according to a type of the one or more data items.

8. The method of claim 1, wherein the mapping of the plurality of control directives comprises a first mapped control directive including a first sequence of one or more inputs to the input component and mapping to a first operation, and a second mapped control directive including a second sequence of inputs to the input component and mapping to a second operation, the first sequence of inputs different from the second sequence of inputs.

9. An apparatus, comprising:
one or more processing circuits;
a display to output information from the apparatus to the user;
one or more input components to receive a first control directive from a user, the first control directive to instruct selection of a content portion from a user interface of a first application executing on the one or more processing circuits and received while the user interface of the first application is presented on the display;

a storage unit storing instructions that when executed by the one or more processing circuits, causes a trigger action component to:

receive a second control directive to select the content portion from the user interface of the first application in response to receiving the first control directive;

select one operation according to a mapping of a plurality of control directives to a plurality of operations;

request the selected operation on the selected content portion by a second application different from the first application and different from the trigger action component, the operation performed by the second application while the first application remains in a foreground state on the mobile device;

receive an operation result comprising second content different from the selected content from the second application; and present the operation results received from the second application on the display while the first application remains in the foreground.

10. The apparatus of claim 9, the input component comprising a touch-sensitive display, a camera, a microphone, an accelerometer, or a biometric sensor.

11. The apparatus of claim 9, the trigger action component to detect a gesture from an input component comprising a touch-sensitive display; and convert the gesture into the first control directive.

12. The apparatus of claim 9, the trigger action component to:

detect a context on the apparatus;

perform an operation according to the detected context by a third application; and present results of the operation on the display component.

13. At least one computer-readable storage medium comprising instructions that, when executed, cause a mobile device to:

monitor an input component for a mobile device by a trigger action component;

detect, with the trigger action component, an occurrence of a context on the mobile device;

perform an operation, in response to detecting the occurrence of the context, according to the detected context by a first application different from the trigger action component, the operation performed by the first application without modifying the detected context;

receive an operation result comprising content different from the detected context;

present the operation results received from the first application on a display component of the mobile device within or above a user interface on the mobile device, the user interface separate from the first application;

receive a first control directive from a user, the first control directive to instruct selection of a content portion from a user interface of a second application executing on the mobile device;

receive a second control directive to select the content portion;

perform an operation on the selected content portion by a first application different from the second application, the operation performed by the second application while the first application remains in a foreground state on the mobile device;

receive, at the trigger action component, an operation result comprising second content different from the selected content from the second application; and present the operation results on a display component of the mobile device while the first application remains in the foreground.

14. The computer-readable storage medium of claim 13, wherein the operation performed by the first application different from a second application comprises identifying another user on a second device using the second application on the second device, a content creation operation, a content retrieval operation, or a context information operation.

15. The computer-readable storage medium of claim 13, comprising instructions that when executed, cause the mobile device to: extract the selected content from the user interface using an accessibility application program interface (API).

16. The computer-readable storage medium of claim 13, comprising instructions that when executed, cause the mobile device to extract the selected content from the user interface using a data hook provided with the second application.

17. The computer-readable storage medium of claim 13, comprising instructions that when executed, cause the mobile device to store the operation results with a content identifier or a context identifier, and to retrieve the stored operation results.

18. The computer-readable storage medium of claim 13, comprising instructions that when executed, cause the mobile device to: select one operation to request, from a plurality of operations, according to the received control directive and the selected content.

* * * * *